(12) United States Patent
Sweet et al.

(10) Patent No.: US 9,369,493 B2
(45) Date of Patent: *Jun. 14, 2016

(54) SYSTEMS AND METHODS FOR IMPLEMENTING SECURITY

(71) Applicant: CloudPassage, Inc., San Francisco, CA (US)

(72) Inventors: Carson Sweet, San Francisco, CA (US); Vitaliy Geraymovych, Baltimore, MD (US)

(73) Assignee: CloudPassage, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,334

(22) Filed: Jun. 22, 2015

(65) Prior Publication Data

US 2015/0288722 A1    Oct. 8, 2015

Related U.S. Application Data

(63) Continuation of application No. 13/854,513, filed on Apr. 1, 2013, now Pat. No. 9,065,804, which is a continuation of application No. 13/205,948, filed on Aug. 9, 2011, now Pat. No. 8,412,945.

(51) Int. Cl.
*H04L 29/06* (2006.01)
*G06F 21/55* (2013.01)
(Continued)

(52) U.S. Cl.
CPC ............... *H04L 63/20* (2013.01); *G06F 21/55* (2013.01); *G06F 21/56* (2013.01); *G06F 21/577* (2013.01);
(Continued)

(58) Field of Classification Search
CPC ..... H04L 63/20; H04L 63/0428; H04L 63/08; G06F 21/55; G06F 2221/034
USPC ...................... 726/10, 2, 3, 5, 26, 29; 713/150
See application file for complete search history.

(56) References Cited

U.S. PATENT DOCUMENTS 6,385,497 B1    5/2002    Ogushi et al.
6,505,248 B1    1/2003    Casper et al.
(Continued)

FOREIGN PATENT DOCUMENTS

EP          1 818 833 A1      8/2007
WO     WO 2004/027551 A2     4/2004
(Continued)

OTHER PUBLICATIONS

J.D. Meier, et al., "Improving Web Application Security: Threats and Countermeasures" Microsoft Corporation—patterns & practices—https://msdn.microsoft.com/en-us/library/ff647642.aspx, pp. 1-7, published Jun. 2007.

(Continued)

*Primary Examiner* — Sarah Su
(74) *Attorney, Agent, or Firm* — Morgan, Lewis & Bockius LLP

(57) ABSTRACT

Systems and method are provided in accordance with one or more processes that run within an operating system, in which a first process of the one or more processes is an agent that encodes instructions for obtaining an authentication token uniquely associated with the agent. The agent collects security information about a first computer system running the one or more processes according to one or more commands received from a remote security system. The collected information is transmitted to the remote security system on an encrypted communication channel between the agent and the remote security system using the authentication token. Executable instructions are received through the encrypted communication channel at the first computer from the remote server according to a security policy assigned to the agent. The received executable instructions are executed at the first computer system, thereby implementing the assigned security policy.

30 Claims, 10 Drawing Sheets

(51) Int. Cl.
*G06F 21/56* (2013.01)
*G06F 21/57* (2013.01)
(52) U.S. Cl.
CPC ............ *H04L 63/0428* (2013.01); *H04L 63/08* (2013.01); *H04L 63/083* (2013.01); *G06F 2221/034* (2013.01); *H04L 63/0227* (2013.01); *H04L 63/0807* (2013.01); *H04L 63/126* (2013.01); *H04L 63/166* (2013.01)

(56) References Cited

U.S. PATENT DOCUMENTS

| | | | |
|---|---|---|---|
| 6,839,850 | B1 | 1/2005 | Campbell et al. |
| 7,017,185 | B1 | 3/2006 | Wiley et al. |
| 7,017,186 | B2 | 3/2006 | Day |
| 7,028,228 | B1 | 4/2006 | Lovy et al. |
| 7,143,444 | B2 | 11/2006 | Porras et al. |
| 7,316,016 | B2 | 1/2008 | DiFalco |
| 7,360,099 | B2 | 4/2008 | DiFalco et al. |
| 7,418,490 | B1 | 8/2008 | Zhang et al. |
| 7,551,976 | B2 | 6/2009 | Arima et al. |
| 7,587,754 | B2 | 9/2009 | DiFalco et al. |
| 7,594,270 | B2 | 9/2009 | Church et al. |
| 7,620,715 | B2 | 11/2009 | DiFalco et al. |
| 7,657,926 | B1 | 2/2010 | Baker |
| 7,747,736 | B2 | 6/2010 | Childress et al. |
| 7,765,460 | B2 | 7/2010 | DiFalco et al. |
| 7,822,724 | B2 | 10/2010 | DiFalco et al. |
| 7,975,031 | B2 | 7/2011 | Bhattacharya et al. |
| 7,987,444 | B2 | 7/2011 | Fuller et al. |
| 7,991,764 | B2 | 8/2011 | Rathod |
| 7,991,859 | B1 | 8/2011 | Miller et al. |
| 7,996,836 | B1 | 8/2011 | McCorkendale et al. |
| 8,005,879 | B2 | 8/2011 | Bornhoevd et al. |
| 8,005,966 | B2* | 8/2011 | Pandya .................. H04L 29/06 709/223 |
| 8,140,635 | B2 | 3/2012 | DiFalco |
| 8,176,158 | B2 | 5/2012 | DiFalco et al. |
| 8,281,396 | B2 | 10/2012 | Ahmad et al. |
| 8,407,335 | B1 | 3/2013 | Church et al. |
| 8,484,694 | B2 | 7/2013 | Diebler et al. |
| 8,490,188 | B2 | 7/2013 | Kandek et al. |
| 8,539,545 | B2 | 9/2013 | Kartha et al. |
| 8,566,823 | B2 | 10/2013 | Wagner et al. |
| 8,600,996 | B2 | 12/2013 | Good et al. |
| 8,677,499 | B2 | 3/2014 | Lim |
| 8,806,037 | B1* | 8/2014 | Kalra .................... G06F 11/36 709/223 |
| 8,806,638 | B1* | 8/2014 | Mani ................ H04L 63/0227 726/24 |
| 8,819,491 | B2 | 8/2014 | Whitlock et al. |
| 8,843,561 | B2 | 9/2014 | Chen et al. |
| 8,862,941 | B2 | 10/2014 | Whitlock et al. |
| 8,868,987 | B2 | 10/2014 | Wagner |
| 8,874,707 | B1 | 10/2014 | Quilter et al. |
| 8,875,129 | B2 | 10/2014 | Wagner |
| 8,914,341 | B2 | 12/2014 | DiFalco |
| 8,918,883 | B1 | 12/2014 | Boyle et al. |
| 8,925,093 | B2 | 12/2014 | Ahmad et al. |
| 8,996,684 | B2 | 3/2015 | Good et al. |
| 9,026,646 | B2 | 5/2015 | Whitlock et al. |
| 2002/0052715 | A1 | 5/2002 | Maki |
| 2002/0194496 | A1* | 12/2002 | Griffin .................... G06F 21/57 726/17 |
| 2004/0039798 | A1 | 2/2004 | Hotz et al. |
| 2004/0039803 | A1 | 2/2004 | Law |
| 2004/0221174 | A1* | 11/2004 | Le Saint .................. G06F 21/00 726/9 |
| 2004/0230797 | A1 | 11/2004 | Ofek et al. |
| 2004/0260733 | A1 | 12/2004 | Adelstein et al. |
| 2005/0102529 | A1* | 5/2005 | Buddhikot ............. H04L 63/02 726/26 |
| 2005/0246547 | A1 | 11/2005 | Oswald et al. |
| 2006/0150157 | A1 | 7/2006 | Fellenstein et al. |
| 2006/0242277 | A1 | 10/2006 | Torrence et al. |
| 2007/0005511 | A1 | 1/2007 | Martinez |
| 2007/0005961 | A1* | 1/2007 | Hamblin ................. G06F 21/62 713/167 |
| 2007/0043786 | A1 | 2/2007 | DiFalco et al. |
| 2007/0124255 | A1 | 5/2007 | DiFalco et al. |
| 2007/0208918 | A1 | 9/2007 | Harbin et al. |
| 2007/0282986 | A1 | 12/2007 | Childress et al. |
| 2008/0060080 | A1 | 3/2008 | Lim |
| 2008/0083031 | A1 | 4/2008 | Meijer et al. |
| 2008/0109396 | A1 | 5/2008 | Kacin |
| 2008/0262990 | A1* | 10/2008 | Kapoor .................... G06F 9/505 706/20 |
| 2008/0276309 | A1 | 11/2008 | Edelman |
| 2009/0044250 | A1* | 2/2009 | Krahn ..................... G06F 21/31 726/3 |
| 2009/0132703 | A1* | 5/2009 | Fellenstein ........... G06F 9/5072 709/224 |
| 2009/0293056 | A1 | 11/2009 | Ferris et al. |
| 2009/0300607 | A1 | 12/2009 | Ferries et al. |
| 2009/0300719 | A1 | 12/2009 | Ferries et al. |
| 2009/0307744 | A1* | 12/2009 | Nanda .................... G06F 21/335 726/1 |
| 2010/0064009 | A1 | 3/2010 | Chen et al. |
| 2010/0211782 | A1 | 8/2010 | Auradkar et al. |
| 2011/0138038 | A1 | 6/2011 | Good et al. |
| 2011/0239120 | A1 | 9/2011 | Krishnakumar et al. |
| 2011/0258452 | A1 | 10/2011 | Coulier et al. |
| 2012/0023076 | A1 | 1/2012 | Torrence et al. |
| 2012/0023546 | A1 | 1/2012 | Kartha et al. |
| 2012/0089829 | A1 | 4/2012 | Kholidy |
| 2012/0110329 | A1* | 5/2012 | Brown .................... G06F 21/31 713/168 |
| 2012/0158725 | A1 | 6/2012 | Molloy et al. |
| 2012/0159178 | A1 | 6/2012 | Lin et al. |
| 2012/0179805 | A1 | 7/2012 | DiFalco |
| 2012/0222112 | A1 | 8/2012 | DiFalco et al. |
| 2012/0254957 | A1 | 10/2012 | Fork et al. |
| 2013/0054601 | A1 | 2/2013 | Whitlock et al. |
| 2013/0073704 | A1 | 3/2013 | Whitlock et al. |
| 2013/0073715 | A1 | 3/2013 | Whitlock et al. |
| 2014/0053145 | A1 | 2/2014 | Steigleder |
| 2014/0082620 | A1 | 3/2014 | Wagner et al. |
| 2014/0096181 | A1 | 4/2014 | Rivers |
| 2014/0109169 | A1 | 4/2014 | Kandek et al. |
| 2014/0137228 | A1 | 5/2014 | Shema et al. |
| 2014/0268245 | A1 | 9/2014 | Kawach et al. |
| 2014/0280535 | A1* | 9/2014 | Owens .................... H04L 67/14 709/204 |
| 2014/0282817 | A1 | 9/2014 | Singer et al. |
| 2014/0282818 | A1 | 9/2014 | Singer et al. |
| 2014/0310408 | A1 | 10/2014 | Kirner et al. |
| 2014/0310415 | A1 | 10/2014 | Kirner et al. |
| 2014/0373091 | A1 | 12/2014 | Kirner et al. |
| 2015/0026767 | A1* | 1/2015 | Sweet .................... G06F 21/55 726/1 |
| 2015/0058619 | A1* | 2/2015 | Sweet .................... G06F 21/55 713/155 |
| 2015/0127832 | A1 | 5/2015 | Kirner et al. |
| 2015/0128212 | A1 | 5/2015 | Scott et al. |

FOREIGN PATENT DOCUMENTS

| | | | |
|---|---|---|---|
| WO | WO 2004/027619 | A1 | 4/2004 |
| WO | WO 2004/012104 | A1 | 5/2004 |
| WO | WO 2004/059427 | A2 | 7/2004 |
| WO | WO 2004/059428 | A2 | 7/2004 |
| WO | WO 2006/071985 | A2 | 7/2006 |
| WO | WO 2006/105422 | A2 | 10/2006 |
| WO | WO 2006/105443 | A2 | 10/2006 |
| WO | WO 2007/005437 | A2 | 1/2007 |
| WO | WO 2007/005440 | A2 | 1/2007 |
| WO | WO 2007/021823 | A2 | 2/2007 |
| WO | WO 2007/022363 | A2 | 2/2007 |
| WO | WO 2007/022364 | A2 | 2/2007 |
| WO | WO 2007/062423 | A2 | 5/2007 |
| WO | WO 2011/116459 | A1 | 9/2011 |
| WO | WO 2014/141264 | A1 | 9/2014 |
| WO | WO 2014/141283 | A1 | 9/2014 |
| WO | WO 2014/169054 | A1 | 10/2014 |

(56) References Cited

FOREIGN PATENT DOCUMENTS

| WO | WO 2014/169062 A1 | 10/2014 |
| WO | WO 2015/026476 A3 | 2/2015 |
| WO | WO 2015/066208 A1 | 5/2015 |
| WO | WO 2015/066369 A1 | 5/2015 |
| WO | WO 2015/066648 A1 | 5/2015 |

OTHER PUBLICATIONS

An Overview of Vulnerability Scanners, Feb. 2008, pp. 1-16.
U.S. Appl. No. 61/810,480, filed Apr. 10, 2013, Kirner, P. J., et al.
U.S. Appl. No. 61/899,468, filed Nov. 4, 2013, Kirner, P. J., et al.
Almgren, et al. "A Lightweight Tool for Detecting Web Server Attacks", pp. 1-14, Global Security Analysis Laboratory, IBM Research, Zurich Research Laboratory, Rueschlikon, Switzerland, 2000.
Daniels, et al. "A Network Audit System for Host-based Intrusion Detection (NASHID) in Linux", pp. 1-10, Purdue University, CERIAS Technical Report 99/10, 2000.
Dell KACE K1000 Series, Management Appliance, 2010, pp. 1-15.
"Dome9 Releases New Android App for Secure Enterprise Access to Cloud Servers", Virtual-Strategy Magazine, http://www.virtual-strategy.com/2015/03/19/Dome9-Releases-New-Android-App-for-Secure-Enterprise-Access-to-Cloud-Servers, Mar. 19, 2015, pp. 1-2.
Foster, Ian, et al., "Cloud Computing and Grid Computing 360-Degree Compared", Deparment of Computer Science, University of Chicago, IL, USA, pp. 1-10, 2008.
Kaufman L.M., "Data Security in the World of Cloud Computing", Copublished by: The IEEE Computer and Reliability Societies, Jul./Aug. 2009, pp. 61-64.
Myerson, J., "Cloud computing versus grid computing: Service types, similarities and differences, and things to consider", Mar. 3, 2009, IBM Corporation 2009, 8 pages.
Porras, et al. "EMERALD: Event Monitoring Enabling Responses to Anomalous Live Disturbances", pp. 1-13, Computer Science Laboratory, 20th NISSC, Oct. 9, 1997.
Rolim, Carlos oberdan, et al., "A Cloud Computing Solution for Patient's Data Collection in Health Care Institutions", Network and Management Laboratory—LRG, pp. 1-5, 2010.
DK Matai, mi2g, "Who's Going to Secure the Cloud?", http://www.businessinsider.com/whos-going-to-secure-the-cloud-2010-7, pp. 1-5, Jul. 20, 2010.
Kevin Fogarty, "There is no security standard for cloud; move forward anyway", http://www.itworld.com/article/2748285/virtualization/there-is-no-security-standard-for-cloud--move-forward-anyway.html, pp. 1-4, Mar. 11, 2011.
Hoff, "Incomplete Thought: Why Security Doesn't Scale . . . Yet.", http://www.rationalsurvivability.com/blog/2011/01/incomplete-thought-why-security-doesnt-scale-yet/, pp. 1-9, Jan. 11, 2011.
Neil MacDonald, "Five Myths and Realities of Virtualization Security", http://blogs.gartner.com/neil_macdonald/2012/09/06/five-myths-and-realities-of-virtualization-security/, pp. 1-6, Sep. 6, 2012.
Bob Violino, "Five cloud security trends experts see for 2011", http://www.infoworld.com/article/2624725/data-security/five-cloud-security-trends-experts-see-for-2011.html, pp. 1-4, Dec. 29, 2010.

\* cited by examiner

SYSTEMS AND METHODS FOR IMPLEMENTING SECURITY

CROSS REFERENCE TO RELATED APPLICATIONS

The application claims priority to U.S. Pat. No. 9,065,804 entitled "Systems and Methods for Implementing Security in a Cloud Computing Environment," which, in turn, claims priority to U.S. Pat. No. 8,412,945 entitled "Systems and Methods for Implementing Security in a Cloud Computing Environment," each of which is hereby incorporated by reference in its entirety.

FIELD

The present application relates generally to systems and methods for imposing scalable security in a cloud computing environment.

BACKGROUND

The tremendous scalability, flexibility, and speed of Infrastructure-as-a-Service (IaaS) makes it one of the fastest-growing sectors of the cloud computing markets. IaaS providers combine virtualization technologies with substantial infrastructure to deliver bandwidth, storage, and processing power on-demand and with granular control over scale and costs. The benefits of hosting applications and workloads on cloud servers are enormous, making cloud servers the de facto norm for a rapidly growing set of use cases.

Security and compliance, however, remain major challenges to adoption of public cloud infrastructure services. Usage agreements and documentation squarely make the user of IaaS, not the provider, responsible for protecting servers, applications and data in the cloud—essentially everything from the virtual machine operating system upward in the stack.

One challenge to IaaS is that cloud servers attract e-criminals. Online fraud has grown into a sophisticated underground economy that requires infrastructure on a massive scale. Phishing, password cracking, and denial of service attacks leverage botnets. Botnets are illicit networks built from huge numbers of compromised servers and personal computers. Botnets consist of thousands of "zombies", personal computers infected by malware, which carry out commands on behalf of the botnet operator. These compromised computers can bombard web servers with denial-of-service attacks, fire thousands of password attempts per hour, and participate in dozens of other online cracking activities.

Fraudsters and e-criminals use command-and-control software to coordinate zombie attack execution. Command-and-control very frequently operates from compromised servers, without the server owner's knowledge. Fraudsters demand a constant stream of freshly compromised servers to keep botnets running. An entire underground business known as bot herding has emerged to capitalize on this illicit need.

Bot-herders make their living by building botnets to then sell or rent to other e-criminals. This practice has evolved to the point of Fraud-as-a-Service, the sale of prebuilt botnets on demand, for a few hundred dollars a month. It takes bot herders' time and resources to seek out and compromise vulnerable servers. Economies of scale and cost-benefit apply to a bot herding business just as any other. Compromising an elastic cloud infrastructure environment can return a windfall versus hacking into a traditional hardware server. If a bot-herder is able to place command-and-control software on a virtual machine that later is duplicated through cloning or cloud bursting, the botnet capacity will automatically grow. For stakeholders in cloud hosting environments, the implication is a higher expectation of being targeted for server takeovers, root-kitting and botnet command-and-control insertions.

An additional security concern for IaaS is that servers have more exposure in the cloud. More specifically, servers hosted in public IaaS environments have more exposure to compromise than servers do within the traditional data center, where layers of perimeter controls defend server weaknesses from exploit. Cloud IaaS environments rarely offer the control over network topology required to implement perimeter security strategies. As a result, vulnerabilities on each cloud server are more exposed to compromise than those in a traditional data center.

In a typical private data center environment, security chokepoints and/or network demarcation zones (DMZs) exist; firewalls, intrusion detection systems (IDS) and unified threat management devices easily inspect external traffic from sources such as Internet connectivity. Typically, hardware acceleration within the data center boosts performance and compensates for the processing demands required to inspect and control all network traffic in and out of an organization. Because public IaaS environments rarely offer control over hardware or topology, these control mechanisms are unavailable to enterprises hosting servers there.

Traditional perimeter security depends heavily on control over network factors like IP addressing, physical topology and routing. Customers of cloud IaaS have far less of this control; the cloud provider usually dictates network addressing and routing. Server IP addresses are unpredictable, creating serious complications in configuring security mechanisms. Public IaaS environments also typically segment network traffic at the virtual machine level, meaning the only traffic a server can see is its own. It is not possible to use network-level intrusion detection systems, intrusion prevention system or wire-level unified threat management mechanisms in this environment. The performance implications of each cloud server performing traffic inspection at the wire level are staggering, especially given the lack of hardware control. Additionally, the wire-level access to network traffic required of network intrusion detection systems is rarely, if ever, afforded to customers of cloud servers; in multi-tenant cloud environments, such access is impossible since multiple customers share the same network, and allowing access to operate a network IDS would expose multiple customers' network traffic to capture.

Even in a traditional data center with perimeter defenses in place, server-level security such as hardening, secure application configuration, and patch management are important. In the cloud, where front-line defenses are extremely limited, server-level security protection is important. Cloud servers are largely on their own to protect themselves. Strong and highly automated host-based controls that implement all needed capabilities at the host level are important.

An additional security concern for IaaS is that cloud elasticity multiplies attack surfaces. Elasticity is a key differentiator distinguishing IaaS from other infrastructure hosting models. Servers are no longer boxes mounted to racks bolted to the floor. With virtualization and cloud technologies, servers are now files and metadata that can be instantly copied, migrated, and stored offline for later reactivation. Uncontrolled copies of virtual servers and their content can be maliciously or accidentally created nearly instantly; such copies can easily be re-activated in environments also uncontrolled by the server owner. Therefore, only security that is implemented within (and therefore is copied and moves with) a virtual computer is able to protect that virtual computer without regard for its operating location.

Cloud elasticity provides companies with the ability to cloudburst, expanding the number of servers and available computer power within minutes. However, this significantly increases the risk of compromise. The problem is quite simply that as a virtual server duplicates so do its vulnerabilities and exposures. Given the speed with which servers can multiply, this issue can increase the attackable surface area of a cloud server farm dramatically within minutes.

Inactive machine images or snapshots are virtual machines that are saved for later reactivation or as a template for new servers. While this capability is clearly useful, offline server images, being inactive, do not get updates regarding newly discovered vulnerabilities, policy changes, or modification to user accounts and access rights. When a hibernated server is reactivated, there will be access privileges, software vulnerabilities, and outdated configurations that expose it to immediate compromise.

When adopting a cloud-hosting model, system administrators and other stakeholders should be aware of and account for these issues. One incorrectly configured server, either created recently or resurrected from storage, could multiply during cloning and cloud-bursting operations to become the "typhoid Mary" of the cloud farm.

Another challenge to IaaS arises during development of application code in cloud hosting environments. Many organizations, like small businesses and autonomously-operating business units, turn to cloud hosting for application development Public cloud hosting reduces barriers to application development, increasing speed to market for technology related products. Special infrastructure skills, network configuration and hardware setup time are minimal. This is an attractive proposition, especially for business and technology managers frustrated with real or perceived delays and "red tape" associated with infrastructure setup. Sometimes central information technology organizations sanction cloud-based development efforts; in some instances, individual business units charge ahead independently. At some point, all successful development projects go into production. Sometimes the application continues to run in the public cloud environment. Often the application code comes back in-house with the cloud server in a ready-to-run virtual machine image.

If cloud servers used for development are not secured properly, undesired results may occur. These servers are highly exposed, and often the dynamic nature of application development masks signs of intrusion. Compromise impact could include code theft or insertion of malicious functionality into the new application. Any live data used for development purposes, a poor but disturbingly frequent practice, could be at risk and compromised with the server. If rootkits or other malware are dropped onto the cloud server, that malware could come back to the enterprise data center, making a cloud server into a powerful and dangerous Trojan horse.

As the above background details, clearly there is a new set of exposures and risks associated with hosting applications, data and workloads in public IaaS environments. Existing technologies that secure computers are not adequate at addressing such exposures. For instance, hardware based security devices cannot be used by a virtual machine, because virtual machine owners have no ability to deploy hardware. In many public cloud infrastructure hosting environments, the owner of the virtual machine has absolutely no control over hardware in any manner. Server security strategies that depend on creating network perimeter controls are also inadequate because virtual machine owners do not have enough control over the networking environment to implement perimeters. Server security strategies that focus on putting security controls at the host level (host-based security) are also ineffective because existing host-based security technologies almost exclusively perform computation on the computer being protected, which consumes large amounts of computing, storage and other resources on each individual computer. Placing multiple host-based security technologies on a single virtual machine would cause untenable levels of resource consumption on that computer, rendering it unsatisfactory at performing its actual computing function.

The issues above make it clear that improvements in server security management are needed; specifically creation of an elastic security management capability for virtual machines that does not impact the performance of the virtual machine being protected and is able to implement security controls that move with the virtual machine. Conventional perimeter-oriented methods of protection that have worked for years are highly problematic or completely untenable in these environments. The dynamic nature of public and hybrid cloud server farms further complicates matters. The lack of options to protect servers in high-risk public clouds can impede companies from embracing public IaaS and thereby realizing the benefits of IaaS. Thus, there is a need in the art for security measures that secure IaaS servers in an automated, portable, and elastic manner.

SUMMARY

The present disclosure provides security measures that secure virtual computers, especially those in virtualized or cloud-computing (IaaS) environments in an automated, portable, and elastic manner. The present disclosure addresses the needs in the art by making novel use of a system including an agent executive that operates within a virtual machine that securely interoperates with a remote grid computer system specifically optimized for security computation. The aforementioned system provides for security, compliance and integrity of virtual machines by providing related management and automation functions, non-limiting examples of which include virtual machine firewall management, software vulnerability detection, configuration compliance monitoring, system integrity monitoring, detection of intrusion attempts and proactive intervention to prevent intrusion attempts and/or correct vulnerable virtual machine states.

The system depicted in this disclosure provides for dramatic advances in the art, specifically in the methods by which such security, compliance and integrity management functions can be automatically monitored, maintained and managed centrally in a manner that can scale from few to many virtual machines; in the capability to automatically and securely provision and de-provision virtual machines that are cloned, suspended, re-activated and/or moved frequently and in large numbers; in the capability to centrally manage virtual computers that are operating concurrently in a plurality of data centers, collocation providers, cloud hosting providers, and/or Infrastructure-as-a-Service (IaaS) providers; and in the capability to implement secure, reliable communication of management capabilities that can operate in and across untrustworthy or hostile networking and hosting environments.

The fundamental operation of the system includes the initialization of the agent executive upon first execution; an initial and ongoing process to verify the agent executive integrity; and an ongoing cycle in which the agent executive retrieves commands from the remote grid computer system, executes those commands, returns information to the remote grid computer as needed, and the analysis of returned information by the remote grid computer. Based on the remote grid computer's analysis of information retrieved from the agent, additional commands may be issued to the agent executive to implement needed changes to the virtual computer on which the agent operates. Additionally, the agent executive may autonomously perform scheduled actions that are independent from the remote grid computer.

When first executed, the new agent executive must be initialized. The agent executive acquires an API key from a user or by automated means. The agent executive communicates this API key to a remote grid computer system, which creates and assigns a new unique agent identity token using a cryptographic token generation protocol that generates agent identity tokens. The remote grid computer system provides the agent executive with the agent identity token. Thereafter, the agent executive and the remote grid computer system are able to create and consume messages to and from one another in a secure manner, using the agent identity token and corollary grid identity material to mutually encrypt, decrypt, sign, authenticate and verify message contents, non-limiting examples of which include status information, command, and data collected from the virtual machine.

Once the new agent executive is initialized and the integrity of the agent executive is assured, it can be used to collect information specified by the grid computer system to retrieve many types of security-oriented technical information related to any program, data structure, process, or status associated with the virtual machine. To this end, the agent executive collects commands that perform such checks based on messages retrieved from a command queue that is hosted by the grid computer system and is uniquely associated with the agent executive. The agent executive performs the commands issued by the grid computer system and returns a result status and/or requested information about the virtual machine to the grid computer system.

The grid computer system, upon receiving the result status and/or requested information, performs analysis of the status and/or information against sets of rules associated with the virtual machine, but not accessible to the virtual machine, in order to evaluate the security, compliance and integrity of any program, data structure, process, or status associated with the virtual machine. In addition, the grid computer system may issue commands to the agent executive to modify configuration parameters on the virtual machine on which the agent executive operates; such commands would implement protective or reactive modifications to elements directly composing or resident upon the virtual machine, non-limiting examples of which include processes, network services, user accounts and privileges, operating system configuration, application configurations, firewall rules, files, directories, active sessions, log information, and installed software and/or utilities.

Of particular note, the grid computer system does not send these commands directly to the agent executive. Rather, the agent executive reads the commands from a command queue located on the remote grid computer at predetermined intervals and executes the commands once read from the command queue. In this way, the security and integrity of the agent executive is strongly protected from unauthorized access or operational disruption even in an unsecure environment, since no externally accessible network port or service is available on the agent executive to which a potentially detrimental or malicious entity or process might connect and potentially compromise the agent executive's operation.

One type of command set that may be used imposes an operating system security configuration policy for a virtual machine. In this example, the grid computer system issues commands to the agent executive periodically (e.g., every minute, every five minutes, every ten minutes, each hour, each day, etc.) or on some other predetermined basis (e.g., by a schedule) or non-predetermined basis (e.g., by an ad-hoc instruction from the operator) that instructs the agent executive to collect information from the virtual machine that relates to the security of the virtual machine, non-limiting examples of such information including file system permissions, process ownership, open network ports, bindings of processes to network services, user privileges, password strength, configuration settings, installed software, log entries, firewall rules, presence of security controls, and presence of certain data types such as credit-card numbers. The agent executive collects these commands from the command queue, executes the commands to collect needed information, and securely returns this information to the grid computer system.

The grid computer system verifies the authenticity and integrity of the data using cryptographic means, subsequently analyzing the information collected using rules stored on the grid computer system to evaluate the state of security, compliance and integrity of the virtual machine. If the grid computer system determines there is a state of vulnerability or non-compliance on the virtual computer, the grid computer system posts corrective action, in the form of commands to the command queue uniquely associated with the agent executive. The agent executive securely retrieves and then performs these commands and returns the success or failure state to the grid computer system. Based on this state, the grid computer system may take additional steps to remediate a state of vulnerability or non-compliance, up to termination of the virtual machine to absolutely prevent potential compromise.

This process of reading commands and returning information to the grid computer system in order to evaluate and, as needed, remediate virtual computer compliance, security and integrity repeats itself to provide ongoing protection and compliance of the virtual machine. The present disclosure provides additional embodiments for ensuring security in instances where virtual machines are cloned and instances where previously run virtual machines have been restarted after an arbitrary period of inactivity.

First embodiment, from point of view of a server hosting a virtual machine running an agent executive. In this exemplary first embodiment, a server computer system comprises one or more processing units and a memory coupled to at least one of the one or more processing units. The memory stores a virtual machine. An agent executive runs within the virtual machine. The agent executive is executed by at least one of the one or more processing units and comprises instructions for obtaining an agent API key from a user when the agent executive is executed a first time. The agent executive further comprises instructions for communicating the API key to a remote grid computer system in a first part of a synchronous process. The agent executive receives, in a second part of the synchronous process and responsive to the first part of the synchronous process, an agent identity token from the remote grid computer system. The remote grid computer system generates the agent identity token through a cryptographic token generation protocol. The agent executive stores the agent identity token in a secure data store associated with the agent executive. The agent executive collects information on the server computer system for an evaluation of security, compliance and integrity of the agent executive using a plurality of agent self-verification factors. The agent executive, as identified by the agent identity token, encrypts the information for confidentially. The agent executive also digitally signs the information for integrity and authenticity prior to communicating the information to the remote grid computer system as part of an asynchronous process.

In some instances, the agent executive further comprises instructions for querying a command queue on the remote grid computer system, as part of an asynchronous process, for one or more commands, where the command queue is accessed based upon an identity of the agent identity token. Once retrieved, the commands are executed by the agent executive. The commands are encrypted for confidentially and digitally signed for integrity and authenticity before transit. In some instances, a command in the one or more commands is a firewall policy for the virtual machine, a corrective or proactively protective action, a request to recollect the information on the server computer system for an evaluation of integrity of the agent executive using a plurality of agent self-verification factors, or a request to terminate the virtual machine. In some instances, the one or more commands comprise a command set for checking a status of a data structure accessible to the virtual machine or for checking a status of a process running on the virtual machine. In some instances, the one or more commands comprise a command set for checking the status of a setting associated with a file stored in a memory accessible to the virtual machine, a setting of a directory stored in a memory accessible to the virtual machine, or an existence or a status of a process running on the virtual machine. In some instances, the one or more commands comprise a command set for checking a password associated with a user or with a group of users of the virtual machine, for validation of a name-value pair in a file in a memory accessible by the virtual machine, or for checking a status of a network communication port that is associated with the virtual machine.

Second embodiment, from the perspective of a grid computer system in which the agent executive has no preexisting agent identity token. In this exemplary second embodiment, a grid computer system comprises one or more processing units and a memory, coupled to at least one of the one or more processing units. The memory stores a grid node that is executed by at least one of the one or more processing units. The grid node comprises instructions for receiving, in a first part of a synchronous process, an API key from an agent executive running on a virtual machine which, in turn, is running on a computer that is remote to the grid computer system. The grid node determines, in a second part of the synchronous process, whether the API key is a valid API key. The grid node generates, in a third part of the synchronous process, an agent identity token through a cryptographic token generation protocol key when the API key is deemed valid. The grid node communicates, in a fourth part of the synchronous process and responsive to the first part of the synchronous process, the agent identity token to the virtual machine running on the remote computer. The grid node receives encrypted and digitally signed information from the virtual machine from an evaluation of the integrity of the agent executive based upon a plurality of agent self-verification factors. This receiving comprises decrypting the information using the agent identity token to form decrypted information and verifying the signature used to sign the received information. The grid node verifies the integrity of the agent executive based on the decrypted information.

In some instances, the grid node creates, as a function of the agent identity token, a command queue on the grid computer system, where the command queue is unique to the agent executive. Then the grid node posts to the command queue one or more commands to be executed by the agent executive. These one or more commands can be, for example, any of the commands or command sets described above in the first embodiment.

Third embodiment, from the point of view of a grid computer system in which the agent executive has a preexisting agent identity token. In this exemplary third embodiment, a grid computer system comprises one or more processing units and a memory, coupled to at least one of the one or more processing units. The memory stores a grid node. The grid node is executed by at least one of the one or more processing units. The grid node comprises instructions for receiving an alert from a first agent executive running on a first virtual machine running on a computer that is remote to the grid computer system. The alert comprises (i) an indication that the first agent executive has started running on the first virtual machine and (ii) a first agent identity token associated with the first agent executive. The grid node determines whether the first agent identity token is valid. The grid node also determines whether the first agent identity token is being used by a second agent executive running on a second virtual machine. The grid node generates a second agent identity token through a cryptographic token generation protocol when (i) the first agent identity token is valid but is being used by a second agent executive running on a second virtual machine. Once created, the second agent identity token is communicated to the first virtual machine. Thereafter, the grid node receives encrypted and digitally signed information from the first virtual machine from an evaluation of the integrity of the first agent executive based upon a plurality of agent self-verification factors. The grid node decrypts the encrypted information in order to form decrypted information and verifies the signature. Then the grid node determines the integrity of the first agent executive based on the decrypted information.

In some instances, the grid node further comprises instructions for creating, as a function of the second agent identity token, a command queue on the grid computer system, where the command queue is unique to the first agent executive. The grid node posts one or more commands to be executed by the first agent executive to this command queue. These one or more commands can be, for example, any of the commands or command sets described above in the first embodiment.

In some instances, the grid node applies the information received from the first agent executive against one or more rules stored on the grid computer system. When such a rule fails, the grid node, in some instances, posts a corrective or proactively protective action to the command queue on the grid computer system that is uniquely associated with the first agent executive.

Computer program product embodiments. The present disclosure further provides computer program product embodiments that incorporate the instructions of any of the embodiments described above into a computer program product for use in conjunction with a computer system. Such computer program products comprise a tangible computer readable storage medium and a computer program mechanism embedded therein. The computer program mechanism comprises the instructions of any of the embodiments described above.

In some embodiments, systems and method are provided in accordance with one or more processes that run within an operating system. A first process of the one or more processes is an agent that encodes instructions for obtaining an authentication token uniquely associated with the agent. The agent collects security information about a first computer system running the one or more processes according to one or more commands received from a remote security system. The collected security information is transmitted to the remote security system on an encrypted communication channel between the agent and the remote security system, where the encrypted communication channel uses the authentication token. Executable instructions are received through the encrypted communication channel at the first computer from the remote server according to a security policy assigned to the agent. The received executable instructions are executed at the first computer system, thereby implementing the assigned security policy.

BRIEF DESCRIPTION OF THE DRAWINGS

Like reference numerals refer to corresponding parts throughout the several views of the drawings.

DETAILED DESCRIPTION

Figure 1A:
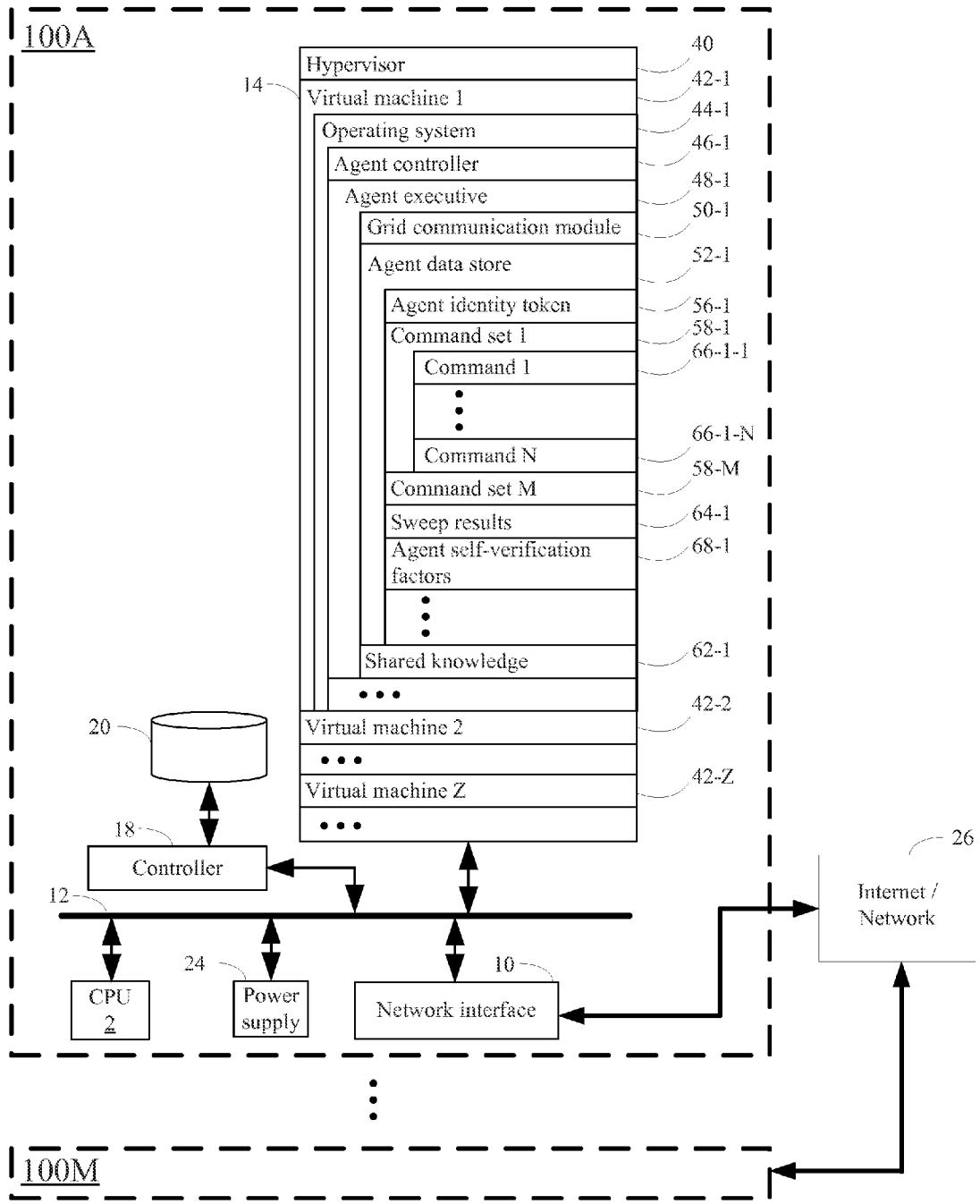
FIG. 1A-FIG. 1B illustrate a system in accordance with the present disclosure.
Figure 1B:
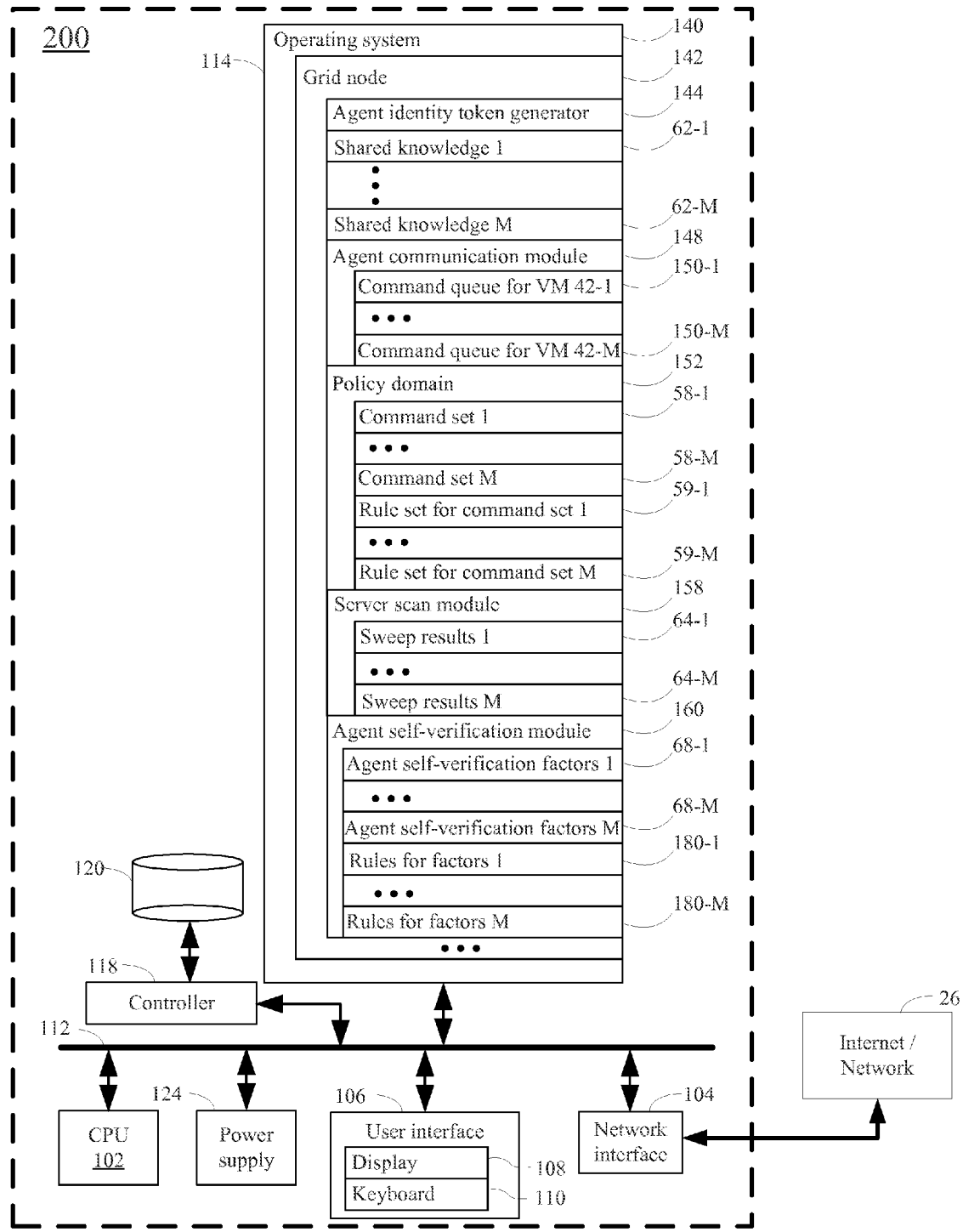

A detailed description of a system in accordance with the present disclosure is described in conjunction with FIG. 1A. As such, FIGS. 1A and 1B collectively illustrate the topology of an environment in accordance with the present disclosure. In the topology, there is a server computer 100 (FIG. 1A) and a grid computer system 200 (FIG. 1B). Of course, other topologies are possible, for instance, grid computer system 200 can in fact be formed from several computers that are linked together in a network. Further, there may be any number of server computers like that of the server computer 100 and functioning in the same manner as the server computer 100, where each such server computer is serviced by the grid computer system 200. Moreover, typically, there are hundreds, thousands, hundreds of thousands of server computers 100 or more. The exemplary topology shown in FIGS. 1A-1B merely serves to describe the features of an embodiment of the present disclosure in a manner that will be readily understood to one of skill in the art.

The server computer 100 will typically have one or more processing units (CPU's) 2, a network or other communications interface 10, a memory 14 (e.g., random access memory), one or more magnetic disk storage and/or persistent devices 20 optionally accessed by one or more controllers 18, one or more communication busses 12 for interconnecting the aforementioned components, and a power supply 24 for powering the aforementioned components. Data in memory 14 can be seamlessly shared with non-volatile memory 20 using known computing techniques such as caching. Memory 14 and/or memory 20 can include mass storage that is remotely located with respect to the central processing unit(s) 2. In other words, some data stored in memory 14 and/or memory 20 may in fact be hosted on computers that are external to the server computer 100 but that can be electronically accessed by the server computer 100 over an Internet, intranet, or other form of network or electronic cable (illustrated as element 26 in FIG. 1A) using network interface 10.

Memory 14 preferably stores a hypervisor 40 for initiating hardware virtual machines 42 and one or more hardware virtual machines 42. There may be any number of hardware virtual machines 42 running on the server computer 100. In some instances, there is only one hardware virtual machine 42 running on the server computer 100. In some instances, there are two or more, three or more, five or more, or ten or more hardware virtual machines 42 running on the server computer 100. In some instances, a single virtual machine 42 is running on multiple server computers 100. Each hardware virtual machines 42 preferably comprises: an operating system 44 that includes procedures for handling various basic system services; an agent controller 46 that is always running when the virtual machine 42 is running, the agent controller serving to ensure that an agent executive 48 is running on the virtual machine 42; where the agent executive 48 provides security in a cloud computing environment.

In preferred embodiments, each agent executive 48 comprises:

a grid communication module 50 that is used for communicating with the grid computer system 200 via one or more communication networks 26, such as the Internet, other wide area networks, local area networks (e.g., a local wireless network can connect the server computer 100 to the grid computer system 200), metropolitan area networks, and so on; and an agent data store 52 or instructions for accessing an agent data store 52, the agent data store 52 storing factors 68 for verification, commands 58, and other data that is used to provide security for virtual computers in a cloud computing environment.

In preferred embodiments, the agent data store 52 stores:
an agent identity token 56 that is uniquely associated with the agent executive 48;
one or more command sets 58, each command set 58 comprising one or more commands 66 that are run by the agent executive 48;
sweep results 64 that are collected by agent executive 48 in response to commands 66 and/or agent self-verification factors 68; and
agent self-verification factors 68 that are used to verify the integrity of the corresponding agent executive 48.

Memory 14 further comprises shared knowledge 62 that is shared with grid computer system 200, the shared knowledge serving to encrypt, decrypt, digitally sign and/or verify data and messages that are communicated between the server computer 100 and the grid computer system 200 as disclosed in further detail below. Direct communication from the remote grid computer system 200 to the agent executive 48 is not possible because agent executive 48 cannot accept a network connection from any device anywhere. Agent executive 48 has no open network communication ports.

Although not stored in agent data store 52 or anywhere else on computer 100, there is an agent API key that is uniquely associated with an organization that controls a respective agent executive 48 or with a policy domain in such cases that a single organization desires to implement multiple policy domains, each of which is intended to control a discrete agent executive 48.

As will be understood by one of skill in the art, there is individual persistent storage (e.g. of type 20) associated 1:1 with each virtual machine 42 residing on server 100. Such storage is where the virtual machine 42 operating systems and files are stored and accessed, and in turn is where the agent binaries and encrypted databases (e.g., agent data store 52) are stored and accessed.

In operation, agent data store 52 is stored in memory 20, although some agent data is held in memory 14 of the virtual computer during operation.

One or more server computers 100 are able to establish a connection via Internet/network to grid computer system 200. FIG. 1A illustrates the connection to only one such server computer 100. In typical embodiments, a grid computer system 200 comprises one or more computers. For purposes of illustration in FIG. 1B, the grid computer system 200 is represented as a single computer that includes all of the functionality of the grid computer system 200. However, the disclosure is not so limited. The functionality of the grid computer system 200 may be spread across any number of networked computers and/or reside on each of several networked computers. One of skill in the art will appreciate that a wide array of different computer topologies are possible for the grid computer system 200 and all such topologies are within the scope of the present invention. Turning to FIG. 1B with the foregoing in mind, an exemplary grid computer system 200 comprises:

one or more processing units (CPU's) 102;
a network or other communications interface 104;
a memory 114;
optionally, one or more magnetic disk storage and/or persistent storage devices 120 accessed by one or more optional controllers 118;
a user interface 106, the user interface 106 including a display 108 and a keyboard or keypad or other data entry device 110;
one or more communication busses 112 for interconnecting the aforementioned components; and
a power supply 124 for powering the aforementioned components.

It will be appreciated that in typical embodiments, user interface 106, display 108, and other data entry devices 110 are not part of a grid computer system. In fact, in typical embodiments, the grid computer system is a virtual machine itself.

In some instances, data in memory 114 can be seamlessly shared with optional non-volatile memory 120 using known computing techniques such as caching.

The memory 114 preferably stores:

an operating system 140 that includes procedures for handling various basic system services and for performing hardware dependent tasks; and
a grid node 142 for providing security in a cloud computing environment.

Typically, a grid node 142 comprises:

an agent identity token generator 144 for generating an agent identity token 56 using a cryptographic token generation protocol when an agent API key provided by an agent executive 48 is deemed valid;
shared knowledge 62 for each of one or more agent executives 48 running on one or more remote server computers 100, such shared knowledge enabling encryption of information that is exchanged between the agent executives 48 and the grid computer system 200;
an agent communication module 148 that is used to communicate commands to one or more virtual machines 42 running on one or more remote server computers 100, the agent communication module 148 including a command queue 150 for each such virtual machine 42, whereby the agent communication module 148 posts commands for a respective agent executive 48 to the command queue 150 that uniquely corresponds to the virtual machine 42 on which the respective agent executive 48 runs;
a policy domain 152 comprising one or more command sets 58 and one or more rule sets 59, where for each command set 58 there is a corresponding rule set 59, each command set 58 including one or more commands, where each such command directs an agent executive 48 to acquire information or perform a task and report back to the grid computer system 200 the status of the task and where each rule set 59 is for processing information provided by an agent executive 48 to the grid computer system 200 upon completion of a corresponding command set 58;
a server scan module 158 which collects information and/or the status of completed tasks upon completion of a command set 58 and stores such data as sweep results 64, each such sweep result uniquely corresponding to a hardware virtual machine 42 serviced by the grid computer system 200; and
an agent self-verification module 160 which keeps an up-to-date list of the agent self-verification factors 68 that are necessary to verify an agent executive 48 running on each virtual machine 42 serviced by the grid computer system 200 as well as rules 180 for processing these factors.

Agent self-verification module 160 comprises agent self-verification corrective command sets and agent self-verification failsafe commands in addition to agent self verification factors 68. Agent self-verification corrective command sets and agent self-verification failsafe command sets comprise the actual commands used to attempt correct an integrity failure, and in the event that self-correction fails, the failsafe actions to be taken (e.g., alert an administrator, shut down the agent executive 48, shut down the virtual machine 42, etc.).

The agent identity token 56 is uniquely associated with an agent executive 48. As disclosed below, the agent identity token 56 is the data by which the uniquely associated agent executive 48 is identified and authenticated to the grid computer system 200. The agent identity token 56 along with shared knowledge 62 is used (i) by the grid communication module 50 to encrypt and sign any message sent to the grid computer system 200, (ii) the agent communication module 148 to decrypt, authenticate the sender of, and verify the integrity of any message received from an agent executive 48, (iii) the agent communication module 148 encrypting and signing any message to an individual agent executive 48; and (iv) the grid communication module 50 to decrypt, authenticate the sender of, and verify the integrity of any message received from the grid computer system 200.

Figure 2:
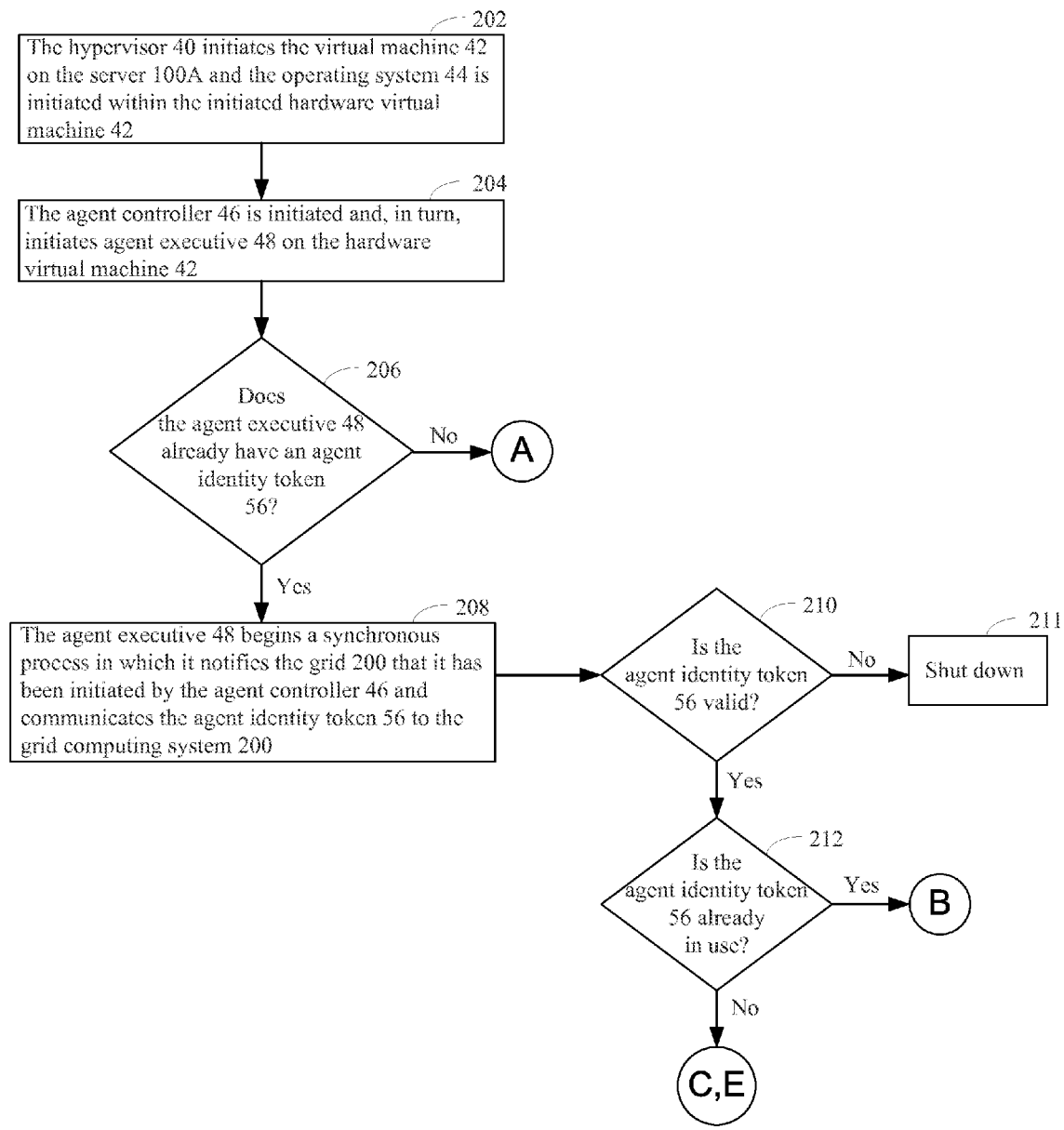
FIG. 2 illustrates the initiation of a hypervisor, agent controller, and agent executive, in accordance with an embodiment of the present disclosure in which the agent executive may or may not have an agent identity token.

Initiation of a hypervisor 40, an agent controller 46, and an agent executive 48 on a server computer 100. FIG. 2 illustrates how a server computer 100 is initiated in accordance with a first embodiment of the present disclosure.

Block 202. In block 202, the hypervisor 40 initiates a virtual machine 42 on the server computer 100 and an operating system 44 is initiated within the initiated virtual machine 42. The hypervisor 40, also called a virtual machine manager (VMM), is any one of many hardware virtualization techniques that allow multiple operating systems 44 to run concurrently on the server computer 100. The hypervisor 40 presents to each of the guest operating systems 44 a virtual operating platform and manages the execution of such operating systems. Multiple instances of a variety of operating systems 44 may share the virtualized hardware resources. Commercial embodiments of the hypervisor 40 include, but are not limited to, OPENSTACK, EUCALYPTUS, VMWARE ESXI, CITRIX XENSERVER, MICROSOFT HYPER-V HYPERVISOR, SUN'S LOGICAL DOMAINS HYPERVISOR, and HP's INTEGRITY VIRTUAL MACHINES. Examples of operating systems 44 include, but are not limited to UNIX, OPEN VMS, LINUX, and MICROSOFT WINDOWS.

Block 204. Once the operating system 44 is running on a virtual machine 42, an agent controller 46 is initiated. The agent controller's primary responsibility is to ensure that an agent executive 48 is running on the virtual machine 42 at all times. Thus, in block 204, the agent controller 46 initiates the agent executive 48 on the hardware virtual machine 42.

Block 206. In block 206, a determination is made by the agent executive 48 as to whether it already has an agent identity token 56 assigned to it. In some instances, an agent executive 48 may already have an agent identity token assigned to it if the virtual machine 42 corresponding to the agent executive 48 had been running before and had stopped running, because of a power outage or computer hardware failure for example, but is now once again running. In some instances, an agent executive 48 may already have an agent identity token 56 assigned to it if the virtual machine 42 corresponding to the agent executive 48 is a cloned copy of another virtual machine 42 that is also running. If the agent executive 48 does not have agent identity token 56 (206—No), then process control passes to block 302 of FIG. 3A, which describes how an API key is obtained. If the agent executive 48 does have an agent identity token 56 (206—Yes), then process control passes to block 208.

Block 208. In block 208, the agent executive 48 begins a synchronous process in which it notifies the grid computer system 200 that the agent executive 48 has been initiated by the agent controller 46. Further, as part of this synchronous process, the agent executive 48 communicates the agent identity token 56 to the grid computing system 200.

Block 210. In block 210, the grid computer system 200 receives the agent identity token 56 from the server computer 100 and determines whether it is valid. This is done by checking the agent identity token 56 against a list of such tokens that is maintained by the grid computer system 200 in memory 114 and/or memory 120 or that is otherwise accessible to the grid computer system 200. If validation is successful in block 210 (210—Yes), process control passes to block 212. If validation is not successful in block 210 (210—No), the agent executive 48 is notified of this failure and process control passes to block 211.

Block 211. In block 211, a synchronous instruction is sent from the grid computer system 200 to the agent executive 48 to shut it down. Optionally, an alert is sent to the user to advise that there was an attempt to utilize an invalid agent identity token 56.

Block 212. Block 212 is reached if agent executive 48 is operating with a valid agent identity token 56. Block 212 is necessary to accommodate cloud bursting in which multiple virtual machines 42, termed children virtual machines, are concurrently executed, where each such child virtual machine 42 is based upon a common parent virtual machine 42 that may still be executing or that may be an inactive virtual machine image upon which agent executive 48 has been previously installed and configured. Such cloud bursting processes have the benefit of providing dynamic servicing of loads that vary in computational intensity over time. For instance, in some embodiments, the parent virtual machine 42 hosts one or more retail modules (not shown in FIG. 1A) that service retail transactions over the Internet. During times of peak demand, such as for sales or during the holidays, the demand on the one or more retail modules increases. To service such demand, multiple children virtual machines 42 may each be generated based on the already implemented parent virtual machine 42. In such instances, each child virtual machine 42 will initially have the same agent identity token 56. In order to uniquely identify and provide adequate security to each of the child virtual machines 42, each such child virtual machine 42 is provided with new a unique agent identity token 56. Thus, if a determination is made that agent identity token 56-1 is a duplicate of an already active agent identity token (one that is being used by an another activated agent executive 48) (212—Yes), then process control passes to block 320 of FIG. 3B. If a determination is made that agent identity token 56-1 is not a duplicate of an already active agent identity token (212—No), then the determination is made that this executive agent 48 is associated with a previously deactivated virtual machine 42 that has been re-activated and process control passes either to block 409 (FIG. 4A) in order to self-verify the virtual machine 42 or, if the agent executive of the virtual machine is already validated, to step 502 (FIG. 5) to begin a sweep.

Figure 3A:
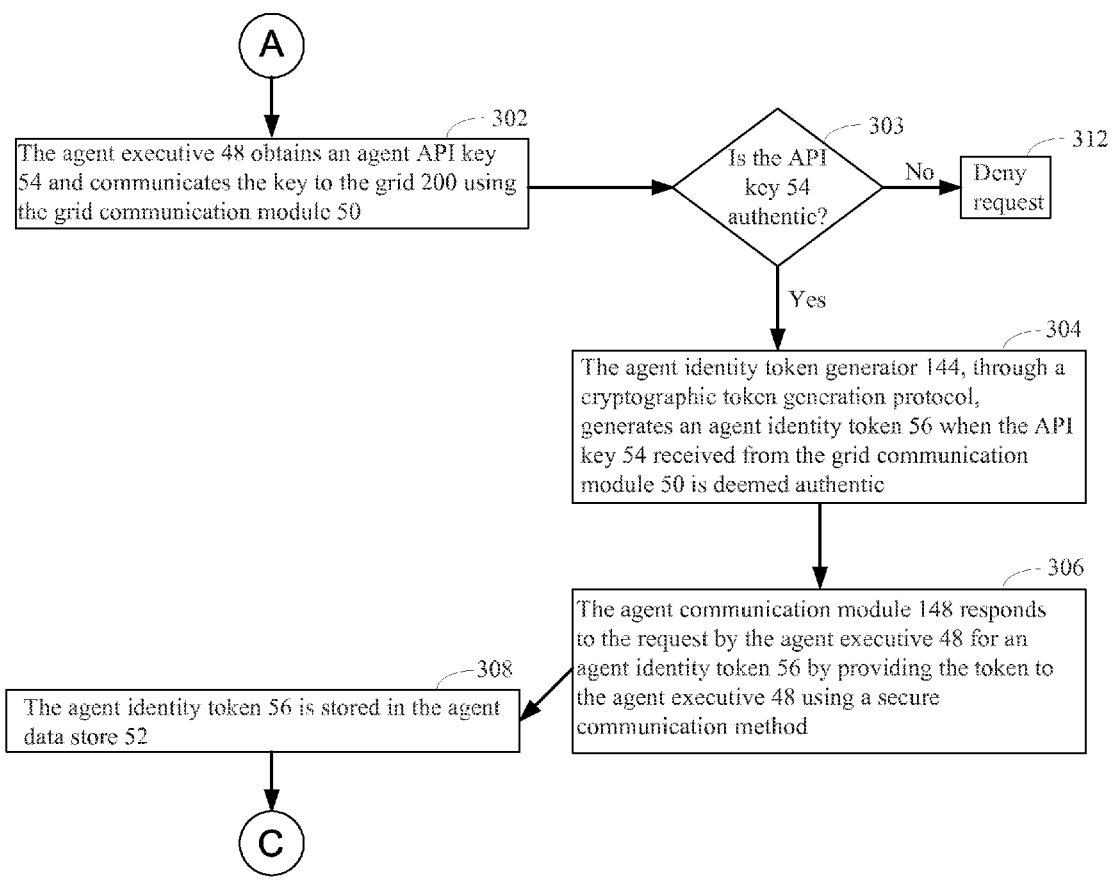
FIG. 3A-FIG. 3B illustrate processes by which an agent executive can acquire a unique agent identity token in accordance with the present disclosure.
Figure 3B:
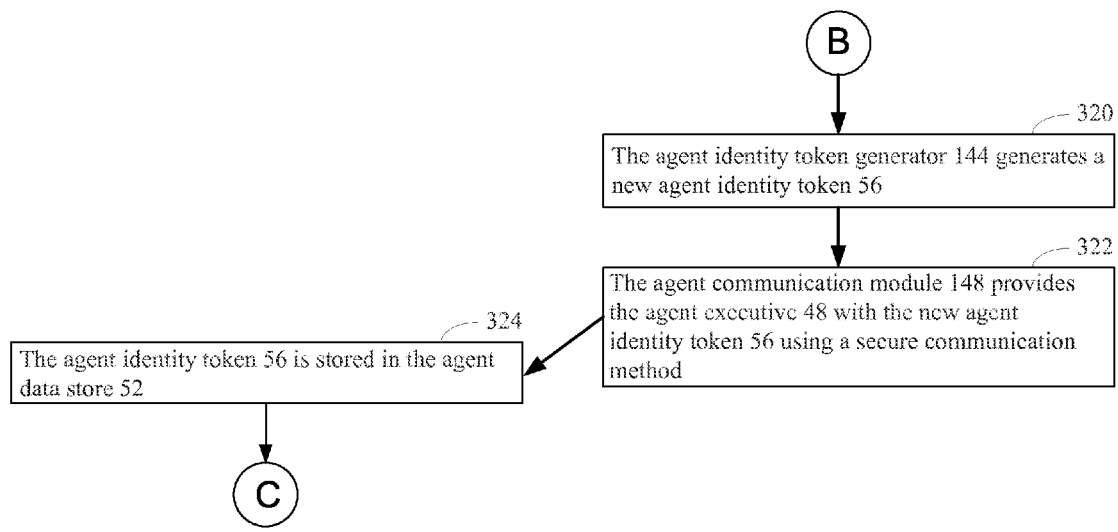

Processes by which an agent executive can acquire a unique agent identity token in accordance with the present disclosure. FIG. 3 illustrates processes by which agent identity tokens 56 are generated in accordance with the present disclosure. A first process, exemplified by blocks 302 through 308 in FIG. 3A, is used when an agent executive 48 does not have an agent identity token 56 (206—No). A second process, exemplified by blocks 320 through 324 in FIG. 3B, is used when a first agent executive 48 has an agent identity token 56 but the agent identity token is already being used by an active virtual machine 42 that was initiated before the virtual machine 42 associated with the first agent executive 48 was executed (212—Yes).

Block 302. Agent executive 48 does not have an agent identity token 56 when initiated for the first time on a virtual machine 42 to ensure security of the virtual machine 42. If block 302 is reached, this means that the agent executive 48 does not have an agent identity token 56. In block 302, the agent executive 48 obtains an agent API key. In some embodiments, the agent executive 48 challenges a user for an API key. In typical practice, the user provides the API key manually or via a user-provided script when the agent executive 48 is started for the first time. Regardless of how the API key is obtained it is communicated to the grid computer system 200 using the grid communication module 50 and process control passes to block 303.

Block 303. In block 303, a determination is made as to whether the API key is authentic. If so (303—Yes), process control passes to block 304. If no (303—No), process control passes to block 312 where the request for an agent identity token 56 is denied. The user is notified of this failure.

Block 304. In block 304, an agent identity token generator 144 operating on the grid computer system 200 generates, through a cryptographic token generation protocol, an agent identity token 56 when the API key received from the grid communication module 50 in block 302 is deemed valid. Any one of a number of cryptographic token generation protocols may be used to generate the agent identity token 56 from the API key.

Block 306. In block 306, the agent communication module 148 responds to the request by the agent executive 48 for an agent identity token 56 by providing the token to the agent executive 48 using a secure communication method.

Block 308. In block 308, the agent identity token 56 is stored in the agent data store 52 and process control passes to block 409.

Block 320. Block 320 begins another process by which a first agent executive 48 may acquire an agent identity token 56. Block 320 is reached in those instances where the first agent executive 48 actually has a valid agent identity token 56, but the agent identity token 56 is already being used by a second active agent executive 48 of a second virtual machine 42 (parent virtual machine) that was initiated at an earlier date than the first virtual machine (212—Yes) (child virtual machine). In such instances, a new agent identity token 56 is generated for the child virtual machine through a cryptographic token generation protocol.

Block 322. In block 322, the agent communication module 148 responds to the request by the agent executive 48 for an agent identity token 56 by providing the token to the agent executive 48 using a secure communication method such as the methods disclosed in the section entitled "Message Security Protocol" below.

Block 324. In block 324, the agent identity token 56 is stored in the agent data store 52 for later use and process control passes to block 409. In preferred embodiments, agent identity token 56 is stored in a persistent data store (e.g., agent data store 52) maintained by agent executive 48. In preferred embodiments, this persistent data store is encrypted at all times using the Advanced Encryption Standard (AES) in Cipher Block Chaining (CBC) mode utilizing a 256-bit key length as described in Federal Information Processing Standards (FIPS) Publication 197, Nov. 26, 2001. In such embodiments, the key and initialization vector required by the agent executive 48 to access encrypted information in the persistent data store, including but not limited to the agent identity token 56, is calculated using multiple data values some based on shared knowledge 62 and some dynamically generated on a one-time basis, that are provided by the remote grid computer 200. This calculation involves agent executive 48 invocation of one of a plurality of possible dynamic key generation protocols, a non-limiting example of which is the Dynamic Symmetric Key Provisioning Protocol (DSKPP) (available on the Internet at tools.ietf.org/searchrfc6063)

Message Security Protocol. The processes illustrated in FIG. 3B provide methods for securing an agent identity token 56 in agent data store 52. As discussed in further detail below, FIGS. 4A-B through 6A-6B illustrate exemplary processes directed to verifying the integrity of virtual machine 42 and performing services for virtual machine 42 (e.g., imposition of a firewall) that require assignment of a unique agent identity token 56 to the virtual machine 42. These exemplary processes further require communication to take place between agent executive 48 and the grid computer system 200. It is desirable that such communications take place in a manner that provides for message confidentiality and integrity. Further, it is desirable that the agent executive 48 and remote grid computer 200 be mutually able to authenticate the source of a message for the purposes of identification and authorization. To accomplish this, a secure messaging protocol is used. This secure messaging protocol, in combination with an agent executive self-verification process described below in conjunction with FIGS. 4A-4B, and the use of unique agent identity tokens 56, satisfy the need for the agent executive 48 to be able to securely operate and communicate with the remote server computer 100 in a relatively untrusted and/or uncontrolled environment, including the transmission of messages across untrusted and/or uncontrolled network environments.

In some embodiments, after agent executive 48 initialization, any message of any type that is generated by the grid computer system 200 to send to the agent executive 48, or by an agent executive 48 to send to the grid computer system 200, is protected from unauthorized disclosure, corruption, replay or spoofing using the disclosed message security protocol. As described in further detail below, the sender of a message assures message authenticity and integrity by utilizing a hash-based message authentication code (HMAC) functionality, in combination with dynamically generated key based on shared secret knowledge between the sender and receiver, to generate a keyed message digest of the message payload. This digest is added to the original message payload, which is then encrypted utilizing the message confidentiality functionality described below, utilizing a dynamically generated key based on shared secret knowledge between the sender and receiver.

The resulting ciphertext is transmitted to the receiver using a mutually authenticated, encrypted network tunnel. In some embodiments, this transmission is secured using an SSL/TLS protocol. TLS and SSL encrypt the segments of network connections above the transport layer using asymmetric cryptography for transmission confidentiality and a keyed message authentication code for transmission integrity and reliability (see RFC 5246 or the Internet at en.wikipedia.org/wiki/Transport_Layer_Security).

The receiver of the message first decrypts the ciphertext after re-creating the symmetric encryption key based on shared secret knowledge between the sender and receiver. If the sender asserted as part of the transmission metadata did not actually send the message, then the shared secret knowledge will be incorrect and the ciphertext will not be successfully decrypted into a meaningful data structure. In such cases the message will be ignored and the receiver may take actions including triggering mechanisms to generate an alert to a possible attempt to compromise security. If the ciphertext is successfully decrypted, the receiver then attempts to further verify authenticity and integrity of the message by re-generating the asserted HMAC message digest included with the message using a key re-generated based on shared secret knowledge between the sender and receiver. The message digest generated by the receiver will not match the asserted message digest and the message will be considered inauthentic and/or corrupted by the receiver if the sender asserted as part of the transmission metadata did not actually generate the HMAC message digest of the message, or if the message has been changed in any fashion since generation of the HMAC digest. In such cases, the message will be ignored and the receiver may take actions including triggering mechanisms to generate an alert to a possible attempt to compromise security. If the decipherment and message authentication/integrity checks are both successful, the receiver will process the message.

Message authenticity and integrity. In order to ensure the authenticity and integrity of such communications, one of a plurality of possible hash-based message authentication code (HMAC) functions is used (see, for example, IETF RFC 2104, "HMAC: Keyed-Hashing for Message Authentication"). These HMAC functions utilize one or more secure hashing algorithms such as SHA-224, SHA-256, SHA-384, or SHA-512, as defined more fully in Federal Information Processing Standards Publication 180-3 ("Secure Hash Standard (SHS)"), October 2008. In this messaging security protocol functionality, secret key material used to implement the HMAC is derived by means of a dynamic key generation algorithm mutually known to both the agent executive 48/grid communication module 50 and the remote grid computer system 200. Such key generation utilizes a plurality of encryption, hashing and randomization protocols, non-limiting examples of which include AES-256-CBC, the SHA-224 hashing algorithm, and/or the SHA-256 hashing algorithm. In some embodiments, such algorithms are combined into a multi-pass protocol that use as inputs key materials and/or initialization vectors generated from shared knowledge 62 between the grid communication module 50 and the remote grid computer system 200 and values derived from pseudo-random number generation protocols. This algorithm generates secret key material of preferable length no less than 1024 bits, implementing a cryptographic keyspace of a size making it computationally infeasible to check each possible key by brute force. Prior to encryption, this secret key material is used as input to one of a plurality of HMAC implementations such as HMAC-SHA-224, HMAC-SHA-256, HMAC-SHA-384, or HMAC-SHA-512 (see FIPS 180-3). The effect of this combination of cryptographic techniques is implementation of a keyed message digest universally unique to each individual message, with the keyed message digest ensuring that a message may be authenticated and verified for integrity only by the grid computer system 200 and the individual, universally unique agent executive 48/grid communication module 50 that generated a message or for which a message was intended.

Message confidentiality. In some embodiments, confidentiality of messages shared between the agent executive 48 and the remote grid computer 200 is assured utilizing encryption of message payload with AES in CBC mode utilizing a 256-bit key length. The symmetric key used for encryption is derived by means of a dynamic key generation algorithm mutually known to both the agent executive 48 and the remote grid computer system 200. This key generation algorithm utilizes one of a plurality of encryption, hashing and randomization protocols, non-limiting examples of which include AES-256-CBC, the SHA-224 hashing algorithm, and the SHA-256 hashing algorithm. In some embodiments, these algorithms are combined into a multi-pass protocol that use as inputs key materials and/or initialization vectors generated from shared knowledge 62 between the agent executive 48 and the remote grid computer system 200, values derived from pseudo-random number generation protocols, and the agent identity token 56. This algorithm generates secret key material of length preferably no less than 1024 bits, implementing a cryptographic keyspace of a size making it computationally infeasible to check each possible key by brute force. The effect of this combination of cryptographic techniques is implementation of a message confidentiality system in which neither cryptographic key materials nor message payloads are transmitted through or stored within non-controlled, non-secure environments as cleartext, and message delivery in the form of ciphertext that may be decrypted into meaningful and usable cleartext only by the grid computer system 200 and the individual, universally unique agent executive 48 that generated a message or for which a message was intended.

Figure 4A:
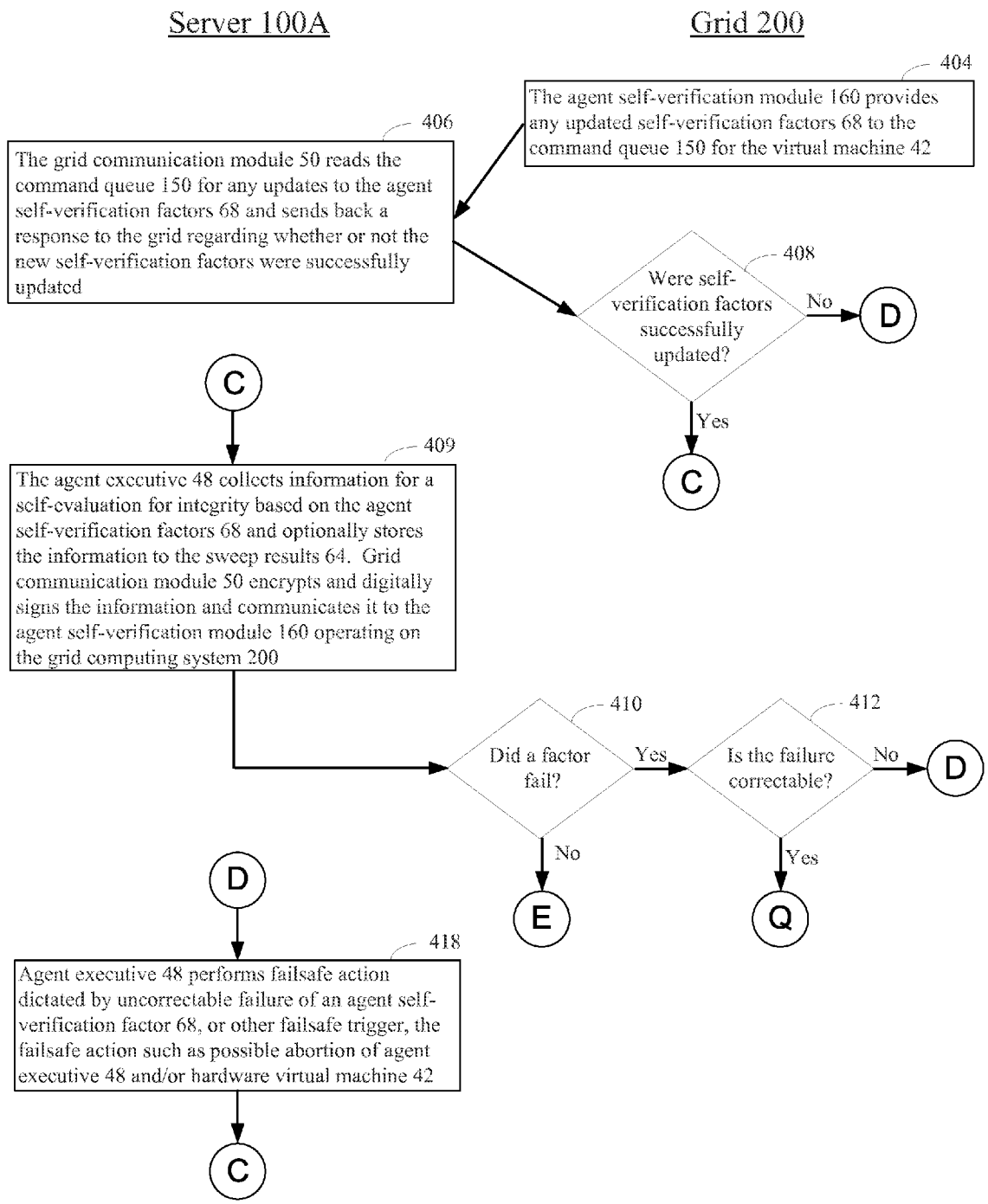
FIG. 4A-FIG. 4B illustrate a method in which the integrity of an agent executive can be verified using a grid computer system in accordance with the present disclosure.
Figure 4B:
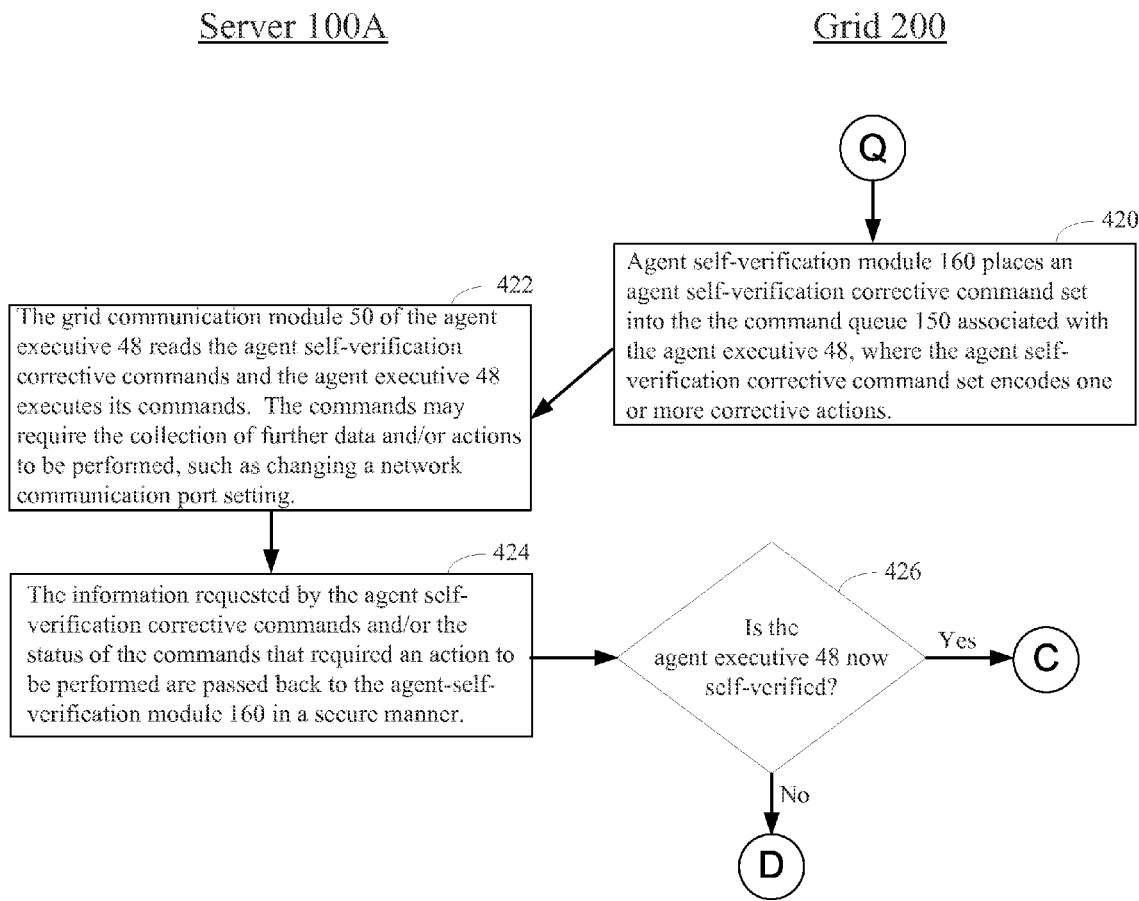

Process for verifying the integrity of an agent executive 48 using a grid computer system 200. FIGS. 4A-4B illustrate processes by which the integrity of an agent executive 48 can be verified using a grid computer system 200 in accordance with the present disclosure once the agent executive 48 has a valid agent identity token 56.

What is depicted in FIG. 4A are two separate processes that run independent of each other. The first process, blocks 404 through 408, serves to update self-verification factors 68 in the virtual machine 42 affected by a policy. Thus, FIG. 4A is executed, for each virtual machine 42 affected by agent self-verification factors 68, whenever a grid computer system 200 administrator changes such self-verification factors 68. Typically, such self-verification factors 68 form part of a policy that encompasses one or more virtual machines 42. In such instances, when the grid computer system 200 administrator changes self-verification factors 68 within such a policy, the process depicted by blocks 404 through 408 is run for each virtual machine 42 affected by the policy.

Block 404. In block 404 the agent self-verification module 160 operating on the grid computer system 200 provides any updated self-verification factors 68 to the command queue 150 for the virtual machine 42. The posting of such factors to the command queue 150 for the virtual machine 42 is advantageous because, for security purposes, the agent executive 48 cannot accept a network connection from any device or process, regardless of whether any such device or process is running within the virtual machine 42, including the agent self-verification module 160. Thus, in order to communicate with the agent executive 48, the agent self-verification module 160 posts the factors to the command queue 150 for retrieval by the virtual machine 42. Block 404 represents a process that is quite apart from, and independent of any self-verification process for any given virtual machine 42. Whenever the self-verification factors 68 on the grid are updated for any reason, command are put on the command queues 150 for any and all agent executives 48 that are in the scope for the changes.

Block 406. In block 406, the grid communication module 50 reads the command queue 150 for the updates to the agent self-verification factors 68. The grid communication module sends back a response to the grid computer system 200 regarding whether or not the new self-verification factors 68 were successfully updated.

Block 408. In block 408, a determination is made as to whether the update of the self-verification factors was successful. If so (408—Yes), process control passes to block 409. If not (408—No), process control passes to block 420 in order to perform failsafe actions.

Block 409. Block 409 begins the process of self-verification. In block 409, the agent executive 48 collects information for a self-evaluation for integrity of the agent executive 48 as dictated by the agent self-verification factors 68. While the agent executive 48 collects the information requested by the agent self-verification factors 68, the agent executive 48 does not actually use the information to determine the integrity of the agent executive 48. Typically, the agent executive 48 stores the information in the agent data store 52. Regardless of whether the information is stored in data store 52, the information is encrypted and signed by the agent executive 48, as identified by the agent identity token 56 associated with the agent executive, and communicated using a secure message security protocol such as the one described in the section above entitled "Message Security Protocol", to the agent self-verification module 160 operating on the grid computer system 200.

Block 410. In block 410, the agent self-verification module 160, operating on the grid computer system 200, makes a determination as to whether any of the self-verification factors 68 have failed. This is done by comparing the information collected in block 408 to one or more associated self-verification rules in the set of self-verification rules 180. If a factor has failed, (410—Yes), then process control passes to block 412. Otherwise (410—No), the agent executive 48 is confirmed to be intact and process control passes to block 502 of FIG. 5.

Block 412. In block 412, a determination is made as to whether the failure detected in block 410 is correctable. If so (412—Yes), process control passes to block 420 of FIG. 4B. If the failure detected is not correctable (412—No), either because (i) the failure was detected on a previous cycle and the agent self-verification corrective commands of FIG. 4B were not able to correct the problem during this previous cycle, or (ii) the initial pass through block 412 determined that the failure was not correctable, process control passes to block 418 in order to initiate failsafe action.

Block 418. In block 418, the agent executive 48 performs a failsafe action dictated by uncorrectable failure of an agent self-verification factor 68 including possible abortion of agent executive 48 and/or hardware virtual machine 42. In practice, although not illustrated in FIG. 4A, the manner in which failsafe action is taken in some embodiments is for agent self-verification module 160 to post agent self-verification failsafe commands to the command queue 150 associated with the agent executive 48, where the agent self-verification failsafe commands encodes one or more failsafe action. As such, agent self-verification failsafe commands includes commands which will, for example, alert an administrator, shut down the agent executive 48, shut down the virtual machine 42, or some combination of the above. Moreover, other examples of failsafe actions including alerting the user by e-mail, setting the state of the agent to "requires attention" in the grid computer system 200, firing a forensic data collection automatically, updating firewall rules or other security configuration parameters, etc. Multiple failsafe actions can be triggered.

Block 420. Turning to FIG. 4B, block 420 is reached if a determination is made that a self-verification factor has failed but that such failure may be correctable. In such instances, agent self-verification module 160 will place an agent self-verification corrective command set into the command queue 150 associated with the agent executive 48, where the agent self-verification corrective command set encodes one or more corrective actions. As such, agent self-verification corrective commands include commands which will, if successfully implemented, cause the agent executive 48 to become valid.

Block 422. The grid communication module 50 of the agent executive 48 reads the agent self-verification corrective commands and the agent executive 48 executes its commands. The commands may require the collection of further data and/or actions to be performed, such as changing a network communication port setting.

Block 424. In some instances, after the agent self-verification corrective commands are executed, the information requested by the agent self-verification corrective commands and/or the status of the commands that required an action to be performed are passed back to the agent-self-verification module 160. As in all instances where information is passed between the server 100 to the grid computer system, such information is encrypted and signed by the agent executive 48, as identified by the agent identity token 56 uniquely associated with the agent executive using, for example, the secure communication methods disclosed in the section entitled "Message Security Protocol" above.

Block 426. If the agent-self-verification module 160 is satisfied with the information received (426—Yes), then the agent executive 48 is deemed corrected for the initial failure and process control passes on to block 409 to ensure correction. If the agent-self-verification module 160 is not satisfied with the information received (426—No), then the agent executive 48 is deemed not corrected for the initial failure and process control passes on to block 418. It will be appreciated that the process illustrated in FIG. 4B can be run in parallel for any number of correctible failures.

Figure 5:
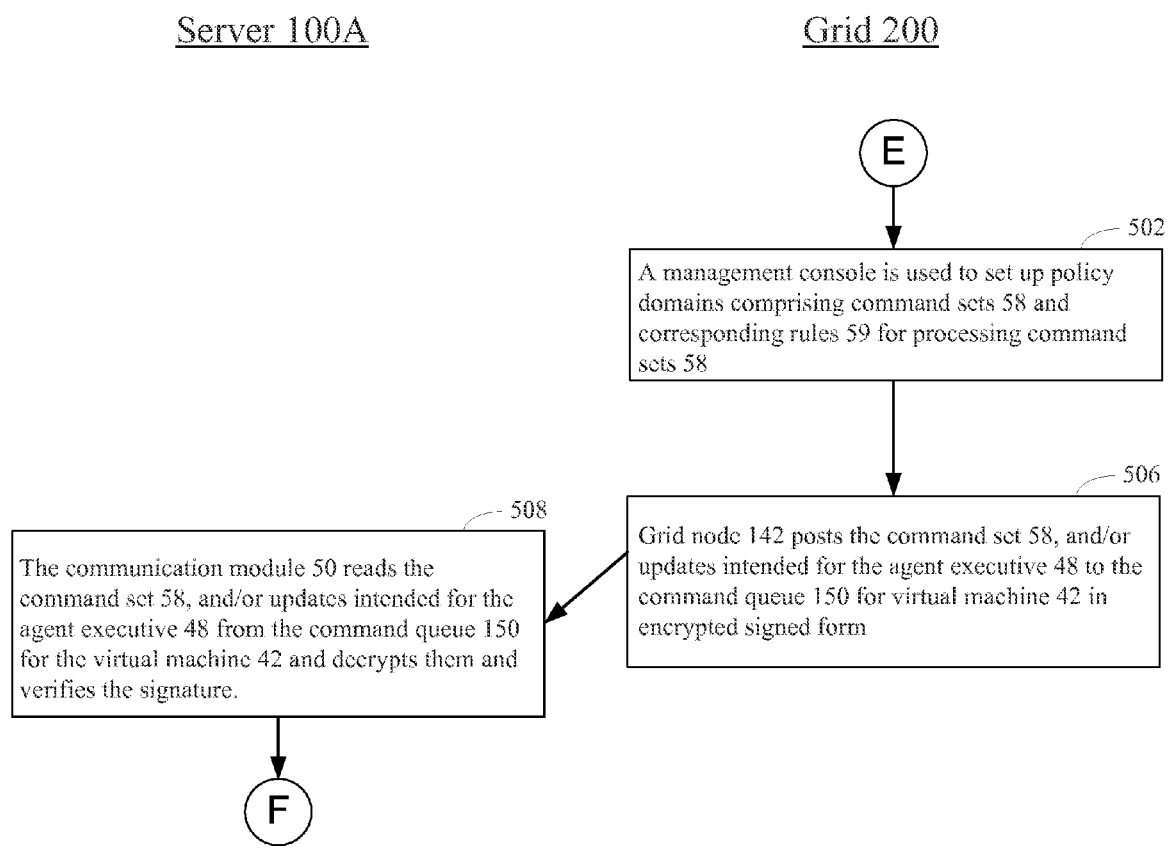
FIG. 5 illustrates a method by which custom command sets that check the integrity of various data structures, processes, file systems, or states associated with a virtual machine, as well as other optional information, can be created using a grid computer system and communicated in a secure manner to a server computer in accordance with the present disclosure.

Checking the security, compliance, and integrity of data structures, processes, file systems, or states associated with a virtual machine using a grid computer system. FIG. 5 illustrates a method by which custom command sets 58 that check the security, compliance, and integrity of various data structures, processes, file systems, or states associated with a virtual machine 42 can be created using the grid computer system 200 and communicated in a secure manner to a server computer 100 in accordance with the present disclosure.

Block 502. In block 502 command sets 58 and corresponding rule sets 59 for processing command sets 58 are set up. In some embodiments, there are two or more command sets 58 for a corresponding virtual machine 42, one for the checking the states of security, compliance and integrity of the operating system 44 running on the virtual machine 42 and the other commands sets for checking the states of security, compliance, and integrity of various programs and/or data structures that are running and/or present on the virtual machine 42 other than the operating system 44.

One or more command sets 58 and their corresponding rule sets 59 constitute a policy domain. The purpose of a policy domain is to establish a specific configuration for each type of virtual machine 42 which will help harden it against and react to prevent attacks. The policy domain consists of a set of commands 58 applied to both the operating system 44 and the applications running on it and a corresponding set of rules 59 to ensure that the commands are appropriately executed. Other commands 58 and corresponding set of rules 59 might be associated with reactive actions designed to prevent a successful attack against virtual machine 42. Groups of virtual machines 42, each running the same operating system 44 and applications can run the same policy domain, greatly reducing the number of command sets 58 that the grid computer system 200 needs. In this way, any rules, commands, scheduling directives and configuration parameters, including firewall rules and configuration directives, may be scoped to affect all virtual machines 42, a single virtual machine 42, or multiple user-defined groups of virtual machines.

In the case of a multi-tenant system, many policy domains 152 would reside in grid node 142. If an operator has one or more private instances of grid module 142, there would likely be only one policy domain 152. One API key is associated with each policy domain 152. The API key initially establishes an association between an agent identity token 56 and the policy domain 152.

A management console associated with the grid computer system 200 is used to create, modify or delete policy domains 152. As such, the management console is used to create, modify or delete one or more rules (and related commands or actions); to modify the frequency with which sweeps and/or commands are executed by the agent executives 48; and to configure other parameters germane to the module in question (e.g., who should receive e-mail alerts, what kind of issue is considered "critical", etc.). Based on the scope of the creations, modifications, deletions made in the management console, the grid computer system puts the messages needed to affect the changes on the message queues of all the virtual machines 42 that are within the scope of the policy domain that has been modified.

Each respective command 66 in a command set 58 checks an important configuration of the operating system 44 and/or an application running on the virtual machine 42 to which the respective rule is applicable. The results of the commands 66 are checked against corresponding rules 59. In some embodiments, each command 66 and its corresponding rule 59 are represented by a name (e.g., "cron should always be running") and a description. (e.g., "the cron daemon should always be running"). In some embodiments, there is an indication as to whether the failure of the rule 59 for a command 66 should be considered a critical risk. If a rule is deemed critical, then failsafe action, up to termination of the virtual machine 42, is designated. However, the failure of a general rule 59 (e.g., a rule not directly associated with agent executive 48 self-verification) doesn't necessarily cause termination of agent executive 48 and virtual machine 42. A rule failure can trigger one or more actions that might include commands to attempt to remediate the issue, generating e-mail or other kinds of alerts, simply recording the rule failure, or going to the extreme of shutting down the agent executive 48 and the virtual machine 42 to absolutely contain the compromise.

Moreover, in some embodiments, rules 59 and, indeed commands 66 and/or commands sets 58, may be designated as active or de-activated. Commands 66 for active command sets 58 are executed by agent executive 48 whereas non-active commands 66 are stored by the grid computer system 200 but are not executed by the agent executive 48. Importantly, while commands 66 are communicated to a server computer system 100, for security purposes, the rules 59 used to interpret the results of the commands sets 58 remain on the grid computer system 200 and cannot be accessed by the server computer system 100.

In some embodiments, a command set 58 comprises one or more commands 66 for checking a status of a data structure accessible to the virtual machine 42 or for checking a status of a process running on the virtual machine 42. In some embodiments, a command set 58 comprises one or more commands 66 for checking the status of a setting associated with a file stored in the agent data store 52 (memory) accessible to the virtual machine 42, a setting of a directory stored in the memory accessible to the virtual machine, or an existence or a status of a process running on the virtual machine 42. In some embodiments, a command set 58 comprises one or more commands 66 for checking a password associated with a user or with a group of users of the virtual machine 42. In some embodiments, a command set 58 comprises one or more commands 66 for checking a status of a network communication port that is associated with the virtual machine 42.

In some embodiments, a command set 58 comprises one or more commands 66 for validation of a name-value pair in a file in a memory accessible by the virtual machine 42. For instance, in some embodiments, a rule 59 comprises a configuration file path (e.g., "/etc/httpd/httpd.conf", an optional configuration file section, a configuration item (first component of the name-value pair, e.g., "User"), a desired value (second component of the name-value pair, e.g., "nobody"), an optional configuration file comment character (e.g., "#"), a configuration item/value delimiter, if any, and a remedial suggestion (e.g., "if this rule fails, the User setting in the Apache configuration file should be changed to 'nobody'"). Thus, in the exemplary rule, if the value for "User" in the Apache configuration file is set to other than "nobody" the rule requires that it be set to "nobody." Thus, in this example, the command 66 for the rule 59 would be to acquire the relevant name-value pair from the file /etc/httpd/httpd.conf form the server computer 100 and the rule 59, operating on the grid computer system 200, would check to see if the name-value pair retrieved by the command 66 is correct (e.g., "User nobody"). If so, the rule passes. If not, the rule fails.

Block 506. In block 506 the grid node 142 posts the command set 58 and/or updates intended for the agent executive 48 to the command queue 150 for virtual machine 42 in encrypted form. In typical embodiments, this information is encrypted and signed prior to sending it to the server computer 100, for example, in the manner set forth in the section entitled "Message Security Protocol" above.

Block 508. In block 508 the communication module 50 reads the command set 58 and other updates from the command queue 150 for the virtual machine 42 and decrypts them, for example, in the manner set forth in the section entitled "Message Security Protocol", above. Process control then passes on to block 602 of FIG. 6A.

Figure 6A:
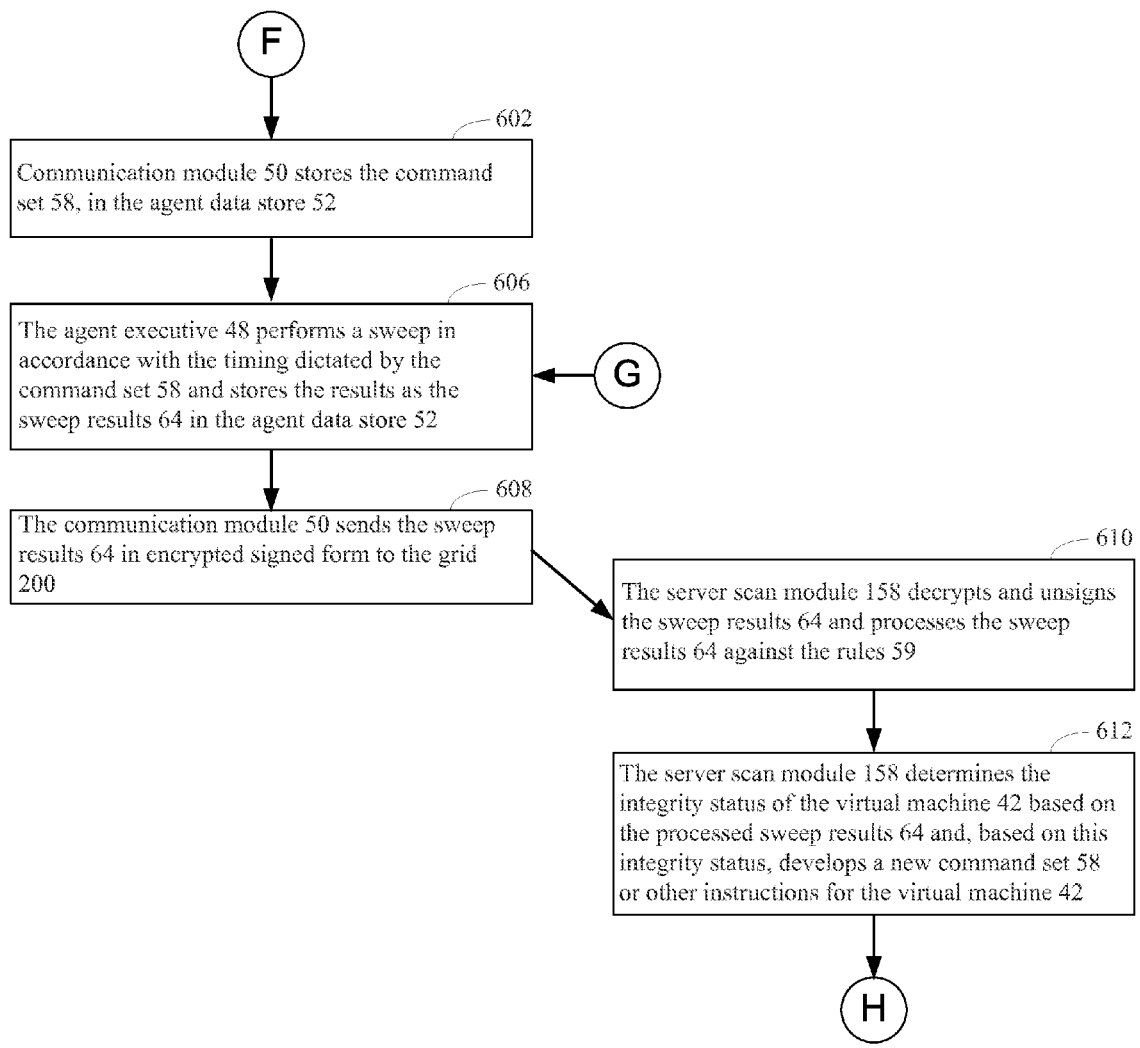
FIG. 6A-FIG. 6B illustrate how sweeps are executed on the server computer 100 and the information from the sweeps is communicated to the grid computer system 200 for evaluation against rules 59 and, based on this evaluation, new commands 66 are provided to the server compute 100 by the grid computer system 200 in accordance with the present disclosure.
Figure 6B:
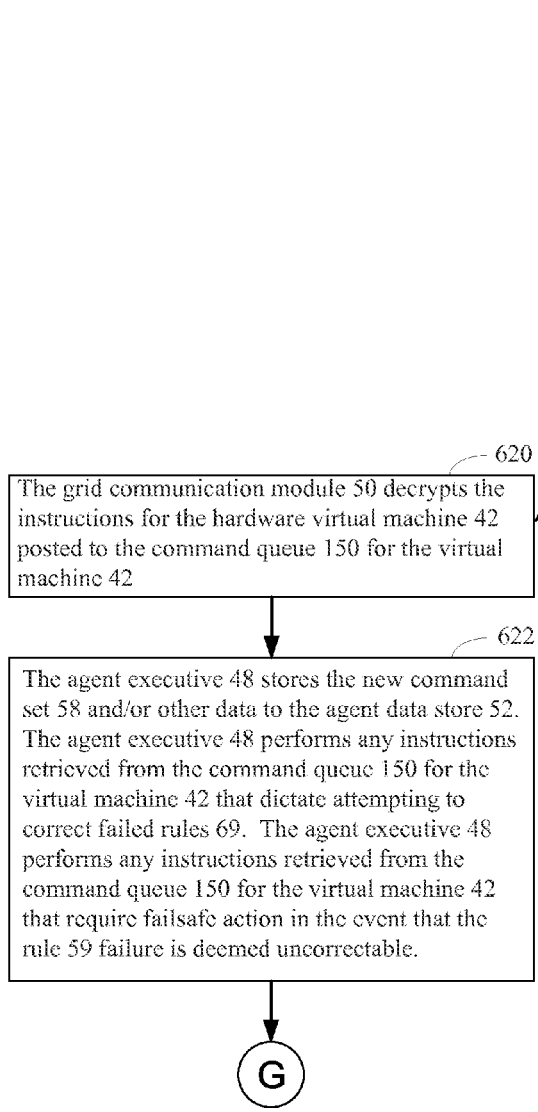
Figure 6B:
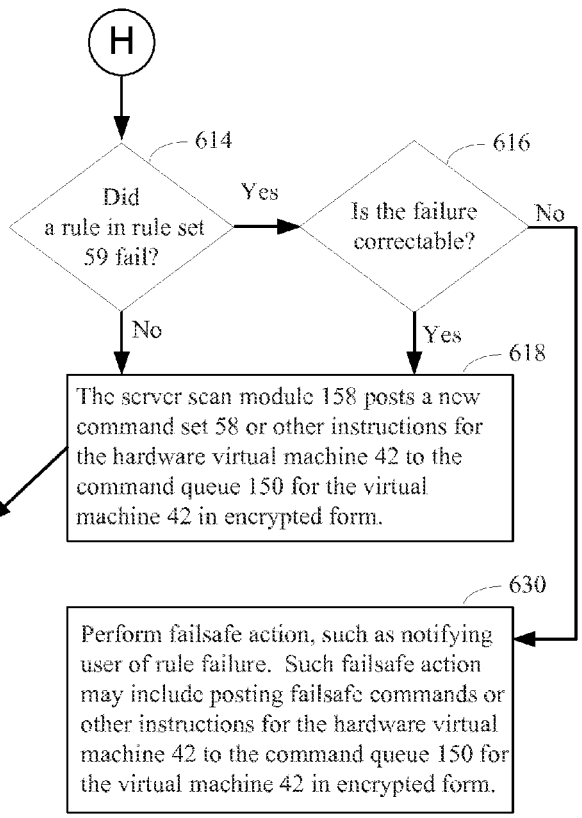

Execution of sweeps on the server computer 100 and the analysis of information retrieved from such sweeps using rules stored on the grid computer system 200. FIG. 6B illustrates an exemplary process for executing a sweep on the server computer 100 and sending the information from the sweep to the grid computer system 200 for evaluation against the rules 59. Based on this evaluation, new commands 66 are provided to the server computer 100 by the grid computer system 200.

Block 602. In block 602 the communication module 50 stores the command set 58 and/or the updated agent self-verification factors 68 in the agent data store 52.

Block 606. In block 606, the agent executive 48 performs a sweep in accordance with the timing dictated by the command set 58 and/or the agent self-verification factors 68 and stores the results as the sweep results 64 in the agent data store 52. In some embodiments, block 606 only executes the commands 66 of one or more command sets 58 and does not collect information mandated by the agent self-verification factors 68. In some embodiments, the commands 66 of one or more command sets 58 are executed and the information mandated by the agent self-verification factors 68 is collected. Examples of commands 66 that may be executed in block 606 are described in block 502 and further examples are provided below.

In some embodiments, a command 66 requests that a certain action be taken. In one example, the command 66 may request that a file in a particular directory be deleted. Such a command is an action command. If an action command is executed in block 606, then the status of the command is captured. For instance, in the case where the action command 66 was to delete a file, the command 66 may achieve a status of "1" if the command 66 successfully deleted the file and "0" otherwise. Non-binary status results for action commands 66 are also possible and are within the scope of the present disclosure. Additional non-limiting examples of action commands that may be executed in block 606 include starting or stopping a process in virtual machine 42, deleting, moving or renaming a file, combination of files or directory, altering the privileges of a user of virtual machine 42, changing the time interval for when sweeps in accordance with block 606 are performed, purging a cache, changing the priority of a process running on the virtual machine 42, deleting or adding a user account, reinitializing the virtual machine 42, activating or deactivating a firewall or policy or a rule within a firewall policy, and making changes to configuration parameters within the operating system 44 and application configuration files.

In some embodiments, a command 66 requests that certain information be retrieved from the virtual machine 42. In one example, the command 66 may request that the size of a file in a particular directory be obtained. Such a command is a collection command. If a collection command is executed in block 606, then the information requested by the command is captured. More collection commands are described in greater detail in block 502 above.

Block 608. In block 608, the communication module 50 sends the sweep results 64 in encrypted form, and signed by the agent executive 48, as identified by the agent identity token 56, to the grid computer system 200 using, for example, the techniques disclosed in the section entitled "Message Security Protocol" above to ensure secure communication of the sweep results 64. In some embodiments, sweep results 64 includes the identity and status of any action command that was executed in block 606 and the data collected by any command that requested information in block 606. In some embodiments, where block 606 also required that information dictated by agent self-verification factors 68 be collected, the sweep results further include the information dictated by the agent self-verification factors 68. It will be appreciated that there is benefit to requiring the agent executive 48 verification from time to time to ensure that the agent executive 48 has not become corrupt. Thus, in some instances of block 606, the information requested by the agent self-verification factors 68 will be collected and this information will be included in the sweep results 64 that are sent to the grid computer system 200 in block 608.

Block 610. In block 610, the server scan module 158 decrypts and unsigns the sweep results 64 using, for example, the techniques disclosed in the section entitled "Message Security Protocol" above to ensure secure communication of the sweep results 64. The server scan module 158 then processes the sweep results 64 against the rules 59. In one example, a command executed in block 66 required that a cryptographic hash of a particular file resident in the corresponding virtual machine 42 be taken. In such an instance, the rule 59 will compare the cryptographic hash value returned by the rule 59 to a predetermined value and, if the cryptographic hash value returned by the rule 59 does not match the predetermined value, the rule 59 will fail. Advantageously, for security reasons, the exact nature of the rules, such as the predetermined value, are stored on the secure grid computer system 200 rather than sent to the relatively untrustworthy or uncontrolled virtual machine 42.

Block 612. In block 612, the server scan module 158 determines the states of security, compliance and integrity of the virtual machine 42 based on the processed sweep results 64 and, based on this integrity status, develops a new command set 58 or other instructions for the virtual machine 42. Blocks 602 through 612 shows the power of the present disclosure. Information can be queried or action can be taken by the integrity-verified agent executive 48 using thoroughly authenticated and verifiable commands 66 acting on a relatively unsecure virtual machine 42 and the results of such commands can be analyzed using rules 59 that are in the secure grid computer system 200. In this way, in combination with other aspects of the disclosure, the states of security, compliance and integrity of virtual machine 42 and the programs running on the virtual machine is continuously assessed, analyzed and improved.

Block 614. In block 614, a determination is made as to whether a rule in rule set 59 failed. If a determination is made that a rule 59 has failed (614—Yes), then process control passes to block 616. If no rule 59 has failed (614—No), then process control passes directly to block 618.

Block 616. In block 616, a determination is made as to whether the failure identified in block 614 is correctable. If a rule in rule set 59 failed and the failure is correctable (616—Yes), then process control passes to block 618 where corrective actions are posted to the command queue 150 for the virtual machine 42 or virtual machines 42 for which the rule failed. If the rule failure is deemed not correctable (616—No), then process control passes to block 630 where failsafe action is taken. In some instance, a rule failure is deemed not correctable after corrective actions were attempted by blocks 618 and 620 and such corrective action failed to remove the rule failure.

Block 618. In block 618, the server scan module 158 posts a new command set 58 or other instructions for the hardware virtual machine 42 to the command queue 150 for the virtual machine 42 in encrypted and signed form. If a rule in rule set 59 failed and the failure is deemed correctable, instructions to attempt correction are posted to the command queue 150 for the virtual machine 42 in encrypted and signed form as well.

If a rule in rule set 59 failed and the failure is deemed correctable then, in practice, the manner in which corrective action is taken in some embodiments is for the server scan module 158 to post a pre-configured or dynamically generated remedial command set 58 to the command queue 150 associated with the agent executive 48, where the remedial command set 58 encodes one or more corrective actions directed to correcting some aspect of the virtual machine 42. Nonlimiting examples of what may be corrected include, but are not limited to, changing a firewall setting, altering a status of a data structure accessible to the virtual machine 42, altering a process running on the virtual machine 42, changing a setting associated with a file stored in a memory accessible to the virtual machine 42, changing a setting of a directory stored in a memory accessible to the virtual machine 42, changing a password associated with a user or with a group of users of the virtual machine 42, resetting or altering a name-value pair in a file in a memory accessible by the virtual machine 42, or changing a network communication port setting that is associated with the virtual machine 42.

Block 620. Once commands, for example commands designed to correct a self-verification factor 68 failure or rule 59 failure have been posted to the command queue 150 associated with the agent executive 48, the grid communication module 50 of the agent executive 48 reads the command set 58 and decrypts them and verifies the signature. In typical embodiments, the techniques disclosed in the section entitled "Message Security Protocol" above are used to communicate this information to the agent executive 48.

Block 622. In block 622, the agent executive 48 stores the new command set 58 and/or other data to the agent data store 52. The agent executive 48 performs any instructions retrieved from the command queue 150 for the virtual machine 42 that dictate attempting to correct failed rules in rule set 59. Once block 622 is completed, process control passes back to block 606 and another iteration of the loop beginning at this block is performed in accordance with the periodic interval or schedule dictated by a command set 58 or by the agent executive 48 itself.

Block 630. Block 630 is reached if a failsafe action needs to be taken because one or more rules in rule set 59 have failed. Such failsafe action may include one or more actions. Such one or more actions may include notifying the user of the failure and/or the posting of failsafe instructions to the command queues 150 for the virtual machines 42 on which the rule in the rule set 59 failed. If such instructions are posted on queues 150 of affected virtual machines 42, in subsequent steps not illustrated in FIG. 6B, such failsafe instructions are read by the virtual machines 42 and executed by the agent executives 48 of the affected virtual machines 42. Depending on the nature of the failsafe action, process control may (i) pass back to block 606 and another iteration of the loop beginning at this block is performed in accordance with the periodic interval or schedule dictated by a command set 58 or by the agent executive 48 itself or (ii) termination of the affected virtual machines 42 initiated.

References Cited and Alternative Embodiments

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a tangible computer readable storage medium. For instance, the computer program product could contain the program modules shown in FIGS. 1A and/or 1B. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. For instance, by way of nonlimiting example, the agent identity token generator 144, agent communication module 148, server scan module 158, and agent self-verification module 160 may all simply be components of a single program, may be components of several different programs, or may each comprise multiple standalone programs. Any combination of these possibilities is possible provided that the functionality described above for these components and modules is achieved. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A first computer system comprising:
one or more processing units;
memory, coupled to at least one of the one or more processing units, wherein the memory stores an operating system, and wherein the operating system is executed by the one or more processing units; and
one or more programs that run within the operating system, wherein a first program of the one or more programs is an agent that is executed by at least one of the one or more processing units, and wherein the agent includes instructions for:
obtaining an authentication token that is uniquely associated with the agent;
collecting security information about the first computer system according to one or more commands received from a remote security system;
transmitting the collected security information to the remote security system on an encrypted communication channel between the agent and the remote security system, wherein the encrypted communication channel uses the authentication token;
receiving executable instructions from the remote security server according to a security policy assigned to the agent, wherein the instructions are received through the encrypted communication channel; and
executing, at the first computer system, the received executable instructions, thereby implementing the assigned security policy.

2. The first computer system of claim 1, wherein the collected security information identifies name-value pairs associated with the one or more processes or name-value pairs for privileges associated with the first computer system.

3. The first computer system of claim 1, wherein the collected security information includes a plurality of data points related to forensic analysis for detection of compromise of the first computer system.

4. The first computer system of claim 1, wherein the executable instructions include updates to a firewall policy for the first computer system.

5. The first computer system of claim 1, wherein the executable instructions include updates to user privileges for the first computer system.

6. The first computer system of claim 1, wherein the executable instructions include delivery of data values related to cryptographic operations to be conducted on the first computer system to access persistent data on the first computer system.

7. The first computer system of claim 1, wherein the executable instructions include instructions for retrieval and use of data values related to cryptographic operations to be conducted on the first computer system in order to access persistent data on the first computer system.

8. The first computer system of claim 1, wherein the executable instructions perform one of (i) a check a status of a setting associated with a file stored in the memory, (ii) a check a setting of a directory stored in the memory, (iii) a check a password associated with a user of the first computer system, or (iv) a check a password associated with a group of users of the first computer system.

9. The first computer system of claim 1, wherein the collected security information identifies what ports the one or more processes are listening on.

10. The first computer system of claim 1, wherein transmitting the collected information uses private information shared but not exchanged with the remote security system to digitally sign and encrypt the collected information prior to transmitting.

11. The first computer system of claim 1, wherein the executable instructions include updates to implement a failsafe action on the first computer in the event of security compromise of the first computer system.

12. The first computer system of claim 11, wherein the failsafe action comprises sending an administrator an alert, shutting down of a virtual machine on the first computer system, shutting down the agent, sending an alert to a user by e-mail, initiating forensic data collection on the first computer system, updating a firewall rule for the first computer system, or updating a configuration parameter on the first computer system.

13. The first computer system of claim 1, wherein there is private information shared but not exchanged with the remote security system and wherein the authentication token and the shared private information enable the encrypted communication channel.

14. The first computer system of claim 1, wherein the collected information identifies configurations of the one or more processes.

15. The first computer system of claim 1, wherein the operating system and the one or more processes run within a first virtual machine within the memory.

16. The first computer system of claim 15, wherein the first virtual machine is one of a plurality of virtual machines running on the first computer system.

17. The first computer system of claim 16, wherein the assigned security policy encompasses the plurality of virtual machines running on the first computer system.

18. The first computer system of claim 1, wherein the assigned security policy encompasses a plurality of computer systems, including the first computer system.

19. The first computer system of claim 1, wherein
the one or more processes run within a virtual machine,
the executable instructions comprise a first command set and a second command set,
the first command set includes a first command to check a state of the operating system, and
the second command set includes a second command to check a state of a process in the one or more processes or a state of a data structure stored in the memory.

20. The first computer system of claim 1, wherein the executable instructions include an action command, and wherein, subsequent to execution of the action command, the execution status of the action command is transmitted to the remote security system.

21. The first computer system of claim 1, wherein
the operating system is running in a virtual machine,
the executable instructions include an action command, and
the action command specifies:
(i) deleting, moving, or renaming of a file, combination of files, or a directory in the memory,
(ii) altering a privilege of a user of the virtual machine,
(iii) changing a time interval upon which the action command is re-executed,
(iv) purging a cache associated with the virtual machine,
(v) changing a priority of a process in the one or more processes,
(vi) deleting or adding a user account associated with the virtual machine,
(vii) reinitializing the virtual machine,
(viii) activating or deactivating a firewall associated with the virtual machine,
(ix) activating or deactivating a rule within a firewall associated with the virtual machine, or
(x) changing a configuration parameter within the operating system.

22. The first computer system of claim 1, wherein the executable instructions include modifications to a multi-factor authentication policy domain that controls the security of the first computer system.

23. The first computer system of claim 1, wherein the collected information includes data related to the integrity of programs and data structures resident on the first computer system.

24. A computer security system comprising:
one or more processing units;
memory; and
one or more programs stored in the memory and configured for execution by the one or more processing units, the one or more programs including instructions for:
receiving a request from an agent program running within an operating system on a remote computer distinct from the computer security system;
generating a unique authentication token for the agent program;
transmitting the unique authentication token to the agent program;
transmitting a plurality of commands to the agent program, for execution by the agent program to collect information for an evaluation of the operating system;
receiving information from the agent program on an encrypted communication channel between the agent and the computer security system, wherein the information is obtained by execution of the plurality of commands by the agent program, and wherein the encrypted communication channel uses the authentication token;
selecting a plurality of executable instructions for the agent program according to a security policy assigned to the agent and according to the received information; and
transmitting the plurality of executable instructions to the agent program through the encrypted communication channel for execution at the remote computer, thereby implementing the assigned security policy.

25. The computer security system of claim 24, wherein receiving information through the encrypted communication channel uses data shared but not exchanged with the remote security system to authenticate and decrypt the information.

26. The computer security system of claim 24, wherein selecting the executable instructions comprises:
creating a command queue that is uniquely associated with the agent program; and
posting to the command queue one or more commands to be executed by the agent.

27. The computer security system of claim 24, wherein the agent program is running in a virtual machine on the remote computer and an instruction in the plurality of executable instructions specifies:
(i) deleting, moving, or renaming of a file, combination of files, or a directory associated with the virtual machine,
(ii) altering a privilege of a user of the virtual machine,
(iii) changing a time interval upon which the executable instructions are re-executed by the virtual machine,
(iv) purging a cache associated with the virtual machine,
(v) changing a priority of a process executing on the virtual machine,
(vi) deleting or adding a user account associated with the virtual machine,
(vii) reinitializing the virtual machine,
(viii) activating or deactivating a firewall associated with the virtual machine,
(ix) activating or deactivating a rule within a firewall associated with the virtual machine,
(x) changing a configuration parameter within the operating system,
(xi) delivery of data values related to cryptographic operations to be conducted on the first computer system to access persistant persistent data,
(xii) instructions for retrieval and use of data values related to cryptographic operations to be conducted on the first computer system in order to access persistent data,
(xiii) updates to implement a failsafe action on the first computer in the event of security compromise of the first computer system, or
(xiv) modifications to a multi-factor authentication policy domain that controls the security of the first computer system.

28. The computer security system of claim 24, wherein instructions in the plurality of executable instructions include instructions for:

collecting data regarding a status of a network communication port of the remote computer or collecting data regarding a status of a process running on the remote computer; and transmitting the collected data through the encrypted communication channel for receipt by the computer security system.

29. The computer security system of claim 24, wherein the one or more programs further include instructions for receiving data acquired by the plurality of commands, executed by the agent program on the remote computer, and evaluating the data against one or more rules, wherein the one or more rules are not shared with the remote computer system.

30. The computer security system of claim 24, wherein the unique authentication token is generated for the agent program on the computer security system as part of an initialization procedure for the agent program, and wherein information generated by execution of the plurality of commands cannot be evaluated until the agent program has been assigned the authentication token.

* * * * *